US012628850B2

(12) United States Patent
Popper et al.

(10) Patent No.: US 12,628,850 B2
(45) Date of Patent: May 19, 2026

(54) ENZYMATICALLY STABILIZED PASTA STRUCTURE AND METHOD OF PREPARING THE SAME

(71) Applicant: Mühlenchemie Gmbh & Co. KG, Ahrensburg (DE)

(72) Inventors: Lutz Popper, Ahrensburg (DE); Jana Russnak, Ahrensburg (DE); Anna-Lisa Boje, Ahrensburg (DE); Detlev Rösler, Ahrensburg (DE)

(73) Assignee: Muhlenchemie GmbH & Co. KG, Ahrensburg (DE)

( * ) Notice: Subject to any disclaimer, the term of this patent is extended or adjusted under 35 U.S.C. 154(b) by 355 days.

(21) Appl. No.: 18/044,278

(22) PCT Filed: Oct. 12, 2021

(86) PCT No.: PCT/EP2021/078118
§ 371 (c)(1),
(2) Date: Mar. 7, 2023

(87) PCT Pub. No.: WO2022/078989
PCT Pub. Date: Apr. 21, 2022

(65) Prior Publication Data
US 2023/0329290 A1    Oct. 19, 2023

(30) Foreign Application Priority Data
Oct. 13, 2020    (EP) .................................... 20201559

(51) Int. Cl.
| | |
|---|---|
| *A23L 7/109* | (2016.01) |
| *A23L 29/00* | (2016.01) |
| *A47G 21/18* | (2006.01) |

(52) U.S. Cl.
CPC ............... *A23L 7/109* (2016.08); *A23L 29/06* (2016.08); *A47G 21/18* (2013.01)

(58) Field of Classification Search
CPC .......... A23L 7/109; A23L 29/06; A47G 21/18
(Continued)

(56) References Cited

U.S. PATENT DOCUMENTS

| | | | |
|---|---|---|---|
| 3,520,702 A | 7/1970 | Menzi | |
| 6,383,533 B1 * | 5/2002 | Soeda | ..................... A23L 7/109 |
| | | | 426/18 |

(Continued)

FOREIGN PATENT DOCUMENTS

| | | |
|---|---|---|
| DE | 202018004337 U1 | 11/2018 |
| EP | 0963704 A2 | 12/1999 |

(Continued)

OTHER PUBLICATIONS

Silic, Sladana, et al., "Characterization of Proteins from Grain of Different Bread and Durum Wheat Genotypes," Int. J. Mol. Sci., vol. 12 (2011), pp. 5878-5894.

(Continued)

*Primary Examiner* — Brent T O'Hern
(74) *Attorney, Agent, or Firm* — Pabst Patent Group LLP

(57)    ABSTRACT

The present invention relates to the field of biodegradable, ecologically-friendly consumer goods. In particular, the invention provides a pasta structure comprising at least one enzyme capable of stabilizing the pasta structure, wherein the enzyme is selected from the group comprising a carboxylester hydrolase, a transglutaminase, an oxidase or an oxygenase. The enzyme may reduce or prevent the loss of starch from the pasta when the structure is contacted with water. The pasta structure is suitable for use as a food handling device and may e.g. have the shape of a straw, a bowl, a cup, a plate, a spoon, a fork, a knife, ajar, a funnel, a swizzle stick or a cone. It typically comprises water and wheat selected from the group comprising *Triticum aestivum, Triticum durum, Triticum dicoccum, Triticum spelta,*

(Continued)

a)

| Soaking time | 0 min | 20 min | 30 min | 45 min | 60 min |
|---|---|---|---|---|---|
| T. aestivum flour (untreated) | | | | | |
| T. aestivum flour (Alphamalt VC 5000(1), 100 ppm) | | | | | |
| T. aestivum flour (Pastazym Super Flex(2), 60 ppm) | | | | | |
| T. aestivum flour (Pastazym Duo Pure Flex(3), 100 ppm) | | | | | |

(1) Amylase from *Aspergillus oryzae*, 5,000 SKB-u/g
(2) Lipase from *Thermomyces lanuginosus*
(3) Lipase from *Fusarium oxysporum* b)

| Soaking time | 0 min | 20 min | 30 min | 45 min | 60 min |
|---|---|---|---|---|---|
| T. durum semolina (untreated) | | | | | |
| T. durum semolina (Alphamalt VC 5000, 100 ppm) | | | | | |
| T. durum semolina (Pastazym Super Flex, 60 ppm) | | | | | |

*Triticum monococcum* and a mixture thereof. The invention further provides a method of preparing said pasta structure and a use of at least one enzyme capable of stabilizing a pasta structure, wherein the at least one enzyme is selected from the group comprising a carboxylester hydrolase, a transglutaminase, an oxidase or an oxygenase, for stabilizing the pasta structure. Finally, use of the pasta structure as a food handling device is disclosed, preferably as a drinking straw.

1 Claim, 5 Drawing Sheets

Specification includes a Sequence Listing.

(58) Field of Classification Search
USPC ......................................................... 426/451
See application file for complete search history.

(56) References Cited

U.S. PATENT DOCUMENTS

| | | | | |
|---|---|---|---|---|
| 6,406,723 | B1 * | 6/2002 | Søe et al. ................. | A21D 2/26 |
| | | | | 426/18 |
| 2003/0108641 | A1 | 6/2003 | Soe et al. | |
| 2016/0309746 | A1 * | 10/2016 | Sato ....................... | A21D 8/047 |
| 2019/0387774 | A1 * | 12/2019 | Kittleson ................. | A23B 2/20 |
| 2020/0196786 | A1 | 6/2020 | Zippel | |

FOREIGN PATENT DOCUMENTS

| | | | |
|---|---|---|---|
| EP | 1057415 | A1 | 12/2000 |
| EP | 2103220 | A1 | 9/2009 |
| EP | 2394518 | A1 | 12/2011 |
| EP | 3092907 | A1 | 11/2016 |
| WO | 2020/044049 | A1 | 3/2020 |

OTHER PUBLICATIONS

Press Release by Muhlenchemie, "Pastazym PD achieves strong improvement in the cooking tolerance of pasta," Dec. 13, 2018.

Selinheimo, Emilia, et al., "Tyrosinase and laccase as novel crosslinking tools for food biopolymers," VTT Publications, No. 693 (2008).

Shewry, Peter R., et al., "The structure and properties of glueten: an elastic protein from wheat grain," Phil. Trans. R. Soc. Lond., vol. 357 (2002), pp. 133.142.

Kibar, E. Aytunga Arik, et al., "Effects of Fatty Acid Addition on the Physicochemical Properties of Corn Start," International Journal of Food Properties, vol. 17, No. 1 (2014), pp. 204-218.

Meerts, Mathieu, et al., "Enhancing the Rheological Performance of Wheat Flour Dough and Glucose Oxidase, Transglutaminase or Supplementary Gluten," Food Bioprocess Technol., published online Sep. 5, 2017.

Sacchetti, Giampiero, et al., "Effect of semolina particle size on the cooking kinetics and quality of spaghetti," Procedia Food Science, vol. 1 (2011), pp. 1740-1745.

Morrison, W. R., "Chapter 9—Wheat lipids: structure and functionality," Wheat Production, Properties and Quality, published by Springer-Science+Business Media, B.V., 1996.

Kane, Ian A., et al., "Seafloor microplastic hotspots controlled by deep-sea circulation," Science, vol. 368 (2020), pp. 1140-1145.

Hareland, G.A., "Evaluation of Flour Particle Size Distribution by Laser Diffraction, Sieve Analysis and Near-infrared Reflectance Spectroscopy," Journal of Cereal Science, vol. 20, Iss. 2 (1994), pp. 183-190.

Horstmann, Stefan W., et al., "Starch Characteristics Linked to Gluten-Free Products," Foods, vol. 6 (2017) (21 pgs).

Plastic waste and recycling in the EU: facts and figures—News European Parliament, Updated Jan. 18, 2023.

Buchert, Johanna, et al., "Crosslinking Food Proteins for Improved Functionality," Annual Review Food Science Technology, vol. 1 (2010), pp. 113-138.

Xu, Feng, "Applications of oxidoreductases: Recent progress," Industrial Biotechnology, Spring (2005), pp. 38-50.

Aalami, M., et al., "Effect of Microbial Transglutaminase on Spaghetti Quality," Journal of Food Science, vol. 73, No. 5 (2008), pp. C306-C312.

International Search Report and Written Opinion, PCT/EP2021/078118, mailed Jan. 10, 2022.

International Preliminary Report on Patentability, PCT/EP2021/078118, Mailed Apr. 13, 2023.

* cited by examiner

Fig. 1 a)

| Soaking time | 0 min | 20 min | 30 min | 45 min | 60 min |
|---|---|---|---|---|---|
| *T. aestivum* flour (untreated) | | | | | |
| *T. aestivum* flour (Alphamalt VC 5000[1], 100 ppm) | | | | | |
| *T. aestivum* flour (Pastazym Super Flex[2], 60 ppm) | | | | | |
| *T. aestivum* flour (Pastazym Duo Pure Flex[3], 100 ppm) | | | | | |

(1) Amylase from *Aspergillus oryzae*, 5,000 SKB-u/g
(2) Lipase from *Thermomyces lanuginosus*
(3) Lipase from *Fusarium oxysporum* b)

| Soaking time | 0 min | 20 min | 30 min | 45 min | 60 min |
|---|---|---|---|---|---|
| *T. durum* semolina (untreated) | | | | | |
| *T. durum* semolina (Alphamalt VC 5000, 100 ppm) | | | | | |
| *T. durum* semolina (Pastazym Super Flex, 60 ppm) | | | | | |

Fig. 2
a)
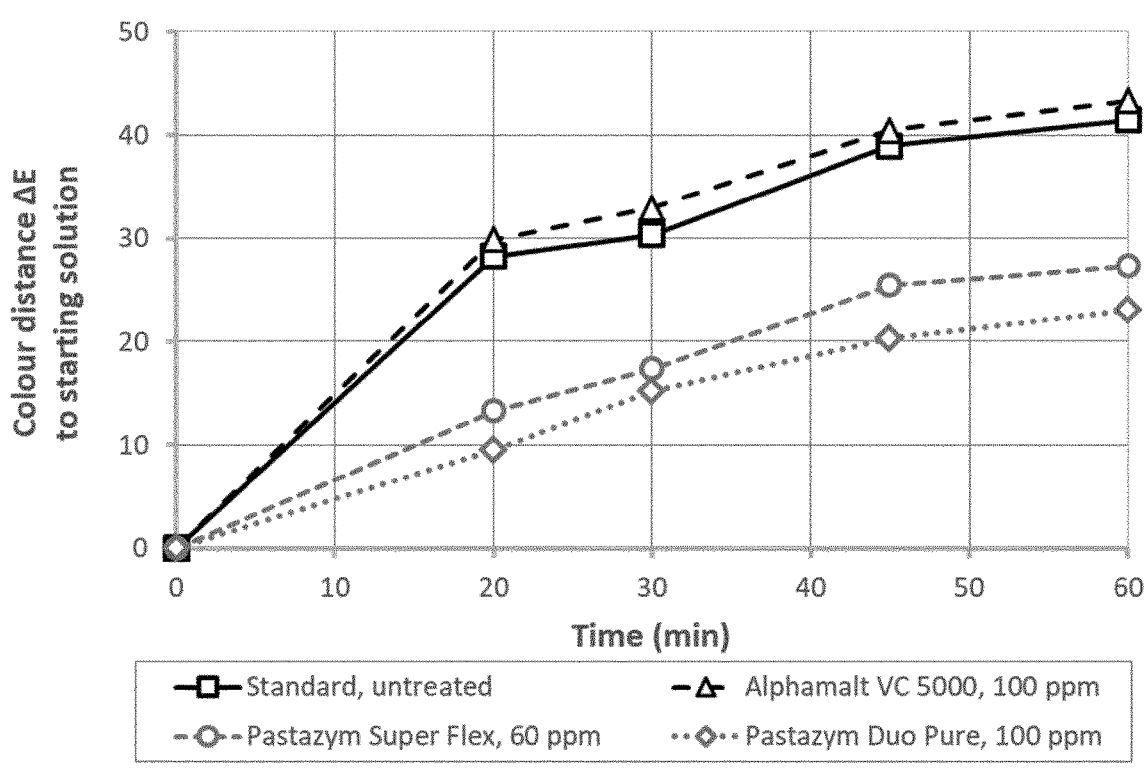
b)
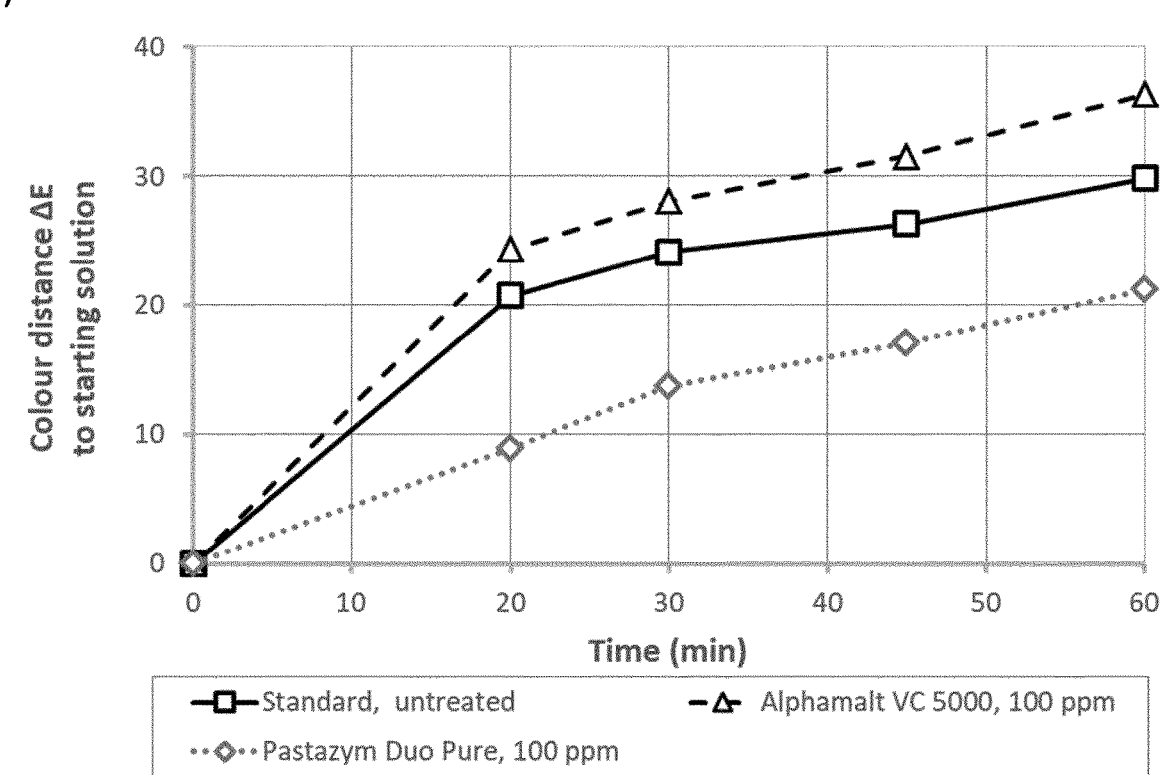

Fig. 3 a)

| Soaking time | 20 min | 30 min | 45 min | 60 min |
|---|---|---|---|---|
| *T. aestivum* flour (untreated) | | | | |
| *T. aestivum* flour (Alphamalt VC 5000, 100 ppm) | | | | |
| *T. aestivum* flour (Pastazym Super Flex, 60 ppm) | | | | |
| *T. aestivum* flour (Pastazym Duo Pure Flex, 100 ppm) | | | | | b)

| Soaking time | 20 min | 30 min | 45 min | 60 min |
|---|---|---|---|---|
| *T. durum* semolina (untreated) | | | | |
| *T. durum* semolina (Alphamalt VC 5000, 100 ppm) | | | | |
| *T. durum* semolina (Pastazym Super Flex, 60 ppm) | | | | |

SEQUENCE LISTING

<160> NUMBER OF SEQ ID NOS: 7

<210> SEQ ID NO 1
<211> LENGTH: 291

-continued

<212> TYPE: PRT
<213> ORGANISM: Thermomyces lanuginosus
<220> FEATURE:
<223> OTHER INFORMATION: Pastazym Duo Pure - Lipase from Thermomyces
      lanuginosus (Humicola lanuginosa)

<400> SEQUENCE: 1

```
Met Arg Ser Ser Leu Val Leu Phe Phe Val Ser Ala Trp Thr Ala Leu
1               5                   10                  15

Ala Ser Pro Ile Arg Arg Glu Val Ser Gln Asp Leu Phe Asn Gln Phe
            20                  25                  30

Asn Leu Phe Ala Gln Tyr Ser Ala Ala Ala Tyr Cys Gly Lys Asn Asn
        35                  40                  45

Asp Ala Pro Ala Gly Thr Asn Ile Thr Cys Thr Gly Asn Ala Cys Pro
    50                  55                  60

Glu Val Glu Lys Ala Asp Ala Thr Phe Leu Tyr Ser Phe Glu Asp Ser
65                  70                  75                  80

Gly Val Gly Asp Val Thr Gly Phe Leu Ala Leu Asp Asn Thr Asn Lys
                85                  90                  95

Leu Ile Val Leu Ser Phe Arg Gly Ser Arg Ser Ile Glu Asn Trp Ile
            100                 105                 110

Gly Asn Leu Asn Phe Asp Leu Lys Glu Ile Asn Asp Ile Cys Ser Gly
            115                 120                 125

Cys Arg Gly His Asp Gly Phe Thr Ser Ser Trp Arg Ser Val Ala Asp
    130                 135                 140

Thr Leu Arg Gln Lys Val Glu Asp Ala Val Arg Glu His Pro Asp Tyr
145                 150                 155                 160

Arg Val Val Phe Thr Gly His Ser Leu Gly Gly Ala Leu Ala Thr Val
                165                 170                 175

Ala Gly Ala Asp Leu Arg Gly Asn Gly Tyr Asp Ile Asp Val Phe Ser
            180                 185                 190

Tyr Gly Ala Pro Arg Val Gly Asn Arg Ala Phe Ala Glu Phe Leu Thr
            195                 200                 205

Val Gln Thr Gly Gly Thr Leu Tyr Arg Ile Thr His Thr Asn Asp Ile
    210                 215                 220

Val Pro Arg Leu Pro Pro Arg Glu Phe Gly Tyr Ser His Ser Ser Pro
225                 230                 235                 240

Glu Tyr Trp Ile Lys Ser Gly Thr Leu Val Pro Val Thr Arg Asn Asp
                245                 250                 255

Ile Val Lys Ile Glu Gly Ile Asp Ala Thr Gly Gly Asn Asn Gln Pro
            260                 265                 270

Asn Ile Pro Asp Ile Pro Ala His Leu Trp Tyr Phe Gly Leu Ile Gly
        275                 280                 285

Thr Cys Leu
    290
```

<210> SEQ ID NO 2
<211> LENGTH: 345
<212> TYPE: PRT
<213> ORGANISM: Fusarium oxysporum
<220> FEATURE:
<223> OTHER INFORMATION: Pastazym Super Flex - Lipase from Fusarium
      oxysporum

<400> SEQUENCE: 2

```
Met Leu Leu Leu Pro Leu Leu Ser Ala Ile Thr Leu Ala Val Ala Ser
1               5                   10                  15
```

-continued

Pro Val Ala Leu Asp Asp Tyr Val Asn Ser Leu Glu Glu Arg Ala Val
            20                  25                  30

Gly Val Thr Thr Thr Asp Phe Gly Asn Phe Lys Phe Tyr Ile Gln His
            35                  40                  45

Gly Ala Ala Ala Tyr Cys Asn Ser Glu Ala Ala Ala Gly Ser Lys Ile
            50                  55                  60

Thr Cys Ser Asn Asn Gly Cys Pro Thr Val Gln Gly Asn Gly Ala Thr
65                  70                  75                  80

Ile Val Thr Ser Phe Gly Ser Lys Thr Gly Ile Gly Gly Tyr Val Ala
                    85                  90                  95

Thr Asp Ser Ala Arg Lys Glu Ile Val Val Ser Phe Arg Gly Ser Ile
            100                 105                 110

Asn Ile Arg Asn Trp Leu Thr Asn Leu Asp Phe Gly Gln Glu Asp Cys
            115                 120                 125

Ser Leu Val Ser Gly Cys Gly Val His Ser Gly Phe Gln Arg Ala Trp
            130                 135                 140

Asn Glu Ile Ser Ser Gln Ala Thr Ala Ala Val Ala Ser Ala Arg Lys
145                 150                 155                 160

Ala Asn Pro Ser Phe Lys Val Ile Ser Thr Gly His Ser Leu Gly Gly
                    165                 170                 175

Ala Val Ala Val Leu Ala Ala Ala Asn Leu Arg Val Gly Gly Thr Pro
            180                 185                 190

Val Asp Ile Tyr Thr Tyr Gly Ser Pro Arg Val Gly Asn Val Gln Leu
            195                 200                 205

Ser Ala Phe Val Ser Asn Gln Ala Gly Gly Glu Tyr Arg Val Thr His
            210                 215                 220

Ala Asp Asp Pro Val Pro Arg Leu Pro Pro Leu Ile Phe Gly Tyr Arg
225                 230                 235                 240

His Thr Thr Pro Glu Phe Trp Leu Ser Gly Gly Gly Gly Asp Thr Val
                    245                 250                 255

Asp Tyr Thr Ile Ser Asp Val Lys Val Cys Glu Gly Ala Ala Asn Leu
            260                 265                 270

Gly Cys Asn Gly Gly Thr Leu Gly Leu Asp Ile Ala Ala His Leu His
            275                 280                 285

Tyr Phe Gln Ala Thr Asp Ala Cys Asn Ala Gly Gly Phe Ser Trp Arg
            290                 295                 300

Arg Tyr Arg Ser Ala Glu Ser Val Asp Lys Arg Ala Thr Met Thr Asp
305                 310                 315                 320

Ala Glu Leu Glu Lys Lys Leu Asn Ser Tyr Val Gln Met Asp Lys Glu
                    325                 330                 335

Tyr Val Lys Asn Asn Gln Ala Arg Ser
            340                 345

<210> SEQ ID NO 3
<211> LENGTH: 605
<212> TYPE: PRT
<213> ORGANISM: Saccharomyces cerevisiae
<220> FEATURE:
<223> OTHER INFORMATION: Sternzym Gloxy - FAD-linked glucose oxidase
      from Saccharomyces cerevisiae

<400> SEQUENCE: 3

Met Gln Thr Leu Leu Val Ser Ser Leu Val Val Ser Leu Ala Ala Ala
1               5                   10                  15

Leu Pro His Tyr Ile Arg Ser Asn Gly Ile Glu Ala Ser Leu Leu Thr
            20                  25                  30

-continued

```
Asp Pro Lys Asp Val Ser Gly Arg Thr Val Asp Tyr Ile Ile Ala Gly
        35                  40                  45

Gly Gly Leu Thr Gly Leu Thr Thr Ala Ala Arg Leu Thr Glu Asn Pro
        50                  55                  60

Asn Ile Ser Val Leu Val Ile Glu Ser Gly Ser Tyr Glu Ser Asp Arg
65                  70                  75                  80

Gly Pro Ile Ile Glu Asp Leu Asn Ala Tyr Gly Asp Ile Phe Gly Ser
                85                  90                  95

Ser Val Asp His Ala Tyr Glu Thr Val Glu Leu Ala Thr Asn Asn Gln
            100                 105                 110

Thr Ala Leu Ile Arg Ser Gly Asn Gly Leu Gly Gly Ser Thr Leu Val
            115                 120                 125

Asn Gly Gly Thr Trp Thr Arg Pro His Lys Ala Gln Val Asp Ser Trp
        130                 135                 140

Glu Thr Val Phe Gly Asn Glu Gly Trp Asn Trp Asp Asn Val Ala Ala
145                 150                 155                 160

Tyr Ser Leu Gln Ala Glu Arg Ala Arg Ala Pro Asn Ala Lys Gln Ile
                165                 170                 175

Ala Ala Gly His Tyr Phe Asn Ala Ser Cys His Gly Val Asn Gly Thr
            180                 185                 190

Val His Ala Gly Pro Arg Asp Thr Gly Asp Asp Tyr Ser Pro Ile Val
            195                 200                 205

Lys Ala Leu Met Ser Ala Val Glu Asp Arg Gly Val Pro Thr Lys Lys
        210                 215                 220

Asp Phe Gly Cys Gly Asp Pro His Gly Val Ser Met Phe Pro Asn Thr
225                 230                 235                 240

Leu His Glu Asp Gln Val Arg Ser Asp Ala Ala Arg Glu Trp Leu Leu
                245                 250                 255

Pro Asn Tyr Gln Arg Pro Asn Leu Gln Val Leu Thr Gly Gln Tyr Val
                260                 265                 270

Gly Lys Val Leu Leu Ser Gln Asn Gly Thr Thr Pro Arg Ala Val Gly
            275                 280                 285

Val Glu Phe Gly Thr His Lys Gly Asn Thr His Asn Val Tyr Ala Lys
        290                 295                 300

His Glu Val Leu Leu Ala Ala Gly Ser Ala Val Ser Pro Thr Ile Leu
305                 310                 315                 320

Glu Tyr Ser Gly Ile Gly Met Lys Ser Ile Leu Glu Pro Leu Gly Ile
                325                 330                 335

Asp Thr Val Val Asp Leu Pro Val Gly Leu Asn Leu Gln Asp Gln Thr
            340                 345                 350

Thr Ala Thr Val Arg Ser Arg Ile Thr Ser Ala Gly Ala Gly Gln Gly
            355                 360                 365

Gln Ala Ala Trp Phe Ala Thr Phe Asn Glu Thr Phe Gly Asp Tyr Ser
        370                 375                 380

Glu Lys Ala His Glu Leu Leu Asn Thr Lys Leu Glu Gln Trp Ala Glu
385                 390                 395                 400

Glu Ala Val Ala Arg Gly Gly Phe His Asn Thr Thr Ala Leu Leu Ile
                405                 410                 415

Gln Tyr Glu Asn Tyr Arg Asp Trp Ile Val Asn His Asn Val Ala Tyr
                420                 425                 430

Ser Glu Leu Phe Leu Asp Thr Ala Gly Val Ala Ser Phe Asp Val Trp
            435                 440                 445
```

-continued

```
Asp Leu Leu Pro Phe Thr Arg Gly Tyr Val His Ile Leu Asp Lys Asp
    450             455             460

Pro Tyr Leu His His Phe Ala Tyr Asp Pro Gln Tyr Phe Leu Asn Glu
465             470             475             480

Leu Asp Leu Leu Gly Gln Ala Ala Ala Thr Gln Leu Ala Arg Asn Ile
            485             490             495

Ser Asn Ser Gly Ala Met Gln Thr Tyr Phe Ala Gly Glu Thr Ile Pro
            500             505             510

Gly Asp Asn Leu Ala Tyr Asp Ala Asp Leu Ser Ala Trp Thr Glu Tyr
            515             520             525

Ile Pro Tyr His Phe Arg Pro Asn Tyr His Gly Val Gly Thr Cys Ser
    530             535             540

Met Met Pro Lys Glu Met Gly Gly Val Val Asp Asn Ala Ala Arg Val
545             550             555             560

Tyr Gly Val Gln Gly Leu Arg Val Ile Asp Gly Ser Ile Pro Pro Thr
            565             570             575

Gln Met Ser Ser His Val Met Thr Val Phe Tyr Ala Met Ala Leu Lys
            580             585             590

Ile Ser Asp Ala Ile Leu Glu Asp Tyr Ala Ser Met Gln
            595             600             605
```

```
<210> SEQ ID NO 4
<211> LENGTH: 604
<212> TYPE: PRT
<213> ORGANISM: Penicillium chrysogenum
<220> FEATURE:
<223> OTHER INFORMATION: Sternzym Gloxy TGO - FAD-linked glucose oxidase
      from Penicillium chrysogenum

<400> SEQUENCE: 4

Met Lys Ser Thr Ile Ile Thr Ser Ile Leu Phe Ser Val Ala Thr Val
1               5               10              15

Gln Ala Tyr Ser Pro Ala Glu Gln Ile Asp Val Gln Ser His Leu Leu
            20              25              30

Ser Asp Pro Thr Lys Val Glu Gly Lys Thr Tyr Asp Tyr Val Ile Ala
        35              40              45

Gly Gly Gly Leu Thr Gly Leu Thr Val Ala Ser Lys Leu Ser Glu Asn
    50              55              60

Pro Lys Ile Lys Val Leu Val Ile Glu Lys Gly Phe Tyr Glu Ser Asn
65              70              75              80

Asp Gly Pro Ile Ile Glu Asp Pro Asn Ala Tyr Gly Glu Ile Phe Gly
            85              90              95

Thr Ser Val Asp Gln Asn Tyr Leu Thr Val Pro Leu Ile Asn Asn Arg
            100             105             110

Thr Gly Glu Ile Lys Ser Gly Leu Gly Leu Gly Gly Ser Thr Leu Ile
            115             120             125

Asn Gly Asp Ser Trp Thr Arg Pro Asp Lys Val Gln Ile Asp Ser Trp
    130             135             140

Glu Lys Val Phe Gly Met Glu Gly Trp Asn Trp Asp Asn Val Phe Gln
145             150             155             160

Tyr Met Gln Lys Ala Glu Arg Ser Arg Pro Pro Thr Ala Ala Gln Ile
            165             170             175

Glu Ala Gly His Phe Tyr Asp Pro Ala Cys His Gly Thr Asp Gly Thr
            180             185             190

Val His Ala Gly Pro Arg Asp Asn Gly Lys Pro Trp Ser Pro Leu Met
    195             200             205
```

-continued

```
Arg Ala Leu Met Asn Thr Val Ser Ala Phe Gly Val Pro Val Gln Lys
    210             215             220

Asp Phe His Cys Gly His Pro Arg Gly Val Ser Met Ile Pro Asn Asn
225             230             235             240

Leu His Glu Asn Gln Ile Arg Ala Asp Ala Ala Arg Glu Trp Leu Leu
            245             250             255

Pro Asn Tyr Gln Arg Asp Asn Leu Gln Ile Leu Thr Gly Gln Lys Val
            260             265             270

Gly Lys Val Leu Phe Asn Gln Thr Ala Ser Gly Pro Lys Ala Val Gly
        275             280             285

Val Asn Phe Gly Thr Asn Lys Ala Val Asn Phe Asn Val Tyr Ala Lys
    290             295             300

Gln Glu Val Leu Leu Ala Ala Gly Ser Ala Ile Ser Pro Leu Ile Leu
305             310             315             320

Glu Tyr Ser Gly Ile Gly Ile Lys Ser Val Leu Asp Lys Ala Gly Val
            325             330             335

Lys Gln Leu Leu Glu Leu Pro Val Gly Leu Asn Met Gln Asp Gln Thr
        340             345             350

Thr Thr Thr Val Arg Ser Arg Ala Asn Asn Ala Pro Gly Gln Gly Gln
        355             360             365

Ala Ala Tyr Phe Ala Asn Phe Thr Glu Val Leu Gly Asp His Ala Ala
    370             375             380

Gln Gly Ile Asn Leu Leu Asp Thr Lys Leu Asp Gln Trp Ala Glu Glu
385             390             395             400

Thr Val Ala Arg Gly Gly Phe His Asn Val Thr Ala Leu Lys Ile Gln
            405             410             415

Tyr Glu Asn Tyr Arg Asn Trp Leu Leu Asp Glu Asp Val Ala Phe Ala
            420             425             430

Glu Leu Phe Phe Asp Thr Glu Gly Lys Ile Asn Phe Asp Ile Trp Asn
        435             440             445

Leu Ile Pro Phe Thr Arg Gly Ser Val His Ile Leu Ser Ser Asp Pro
    450             455             460

Tyr Leu Trp Gln Tyr Ala Asn Asp Pro Lys Phe Phe Met Asn Glu Leu
465             470             475             480

Asp Leu Leu Gly Gln Ala Ala Ala Thr Lys Leu Gly Arg Glu Leu Ser
            485             490             495

Ser Ala Gly Glu Met Lys Lys Tyr Tyr Ala Gly Glu Thr Ile Pro Gly
            500             505             510

Asp Asn Leu Pro Gln Asp Ala Thr Val Glu Gln Trp Glu Asp Tyr Val
        515             520             525

Met Met Asn Phe Arg Pro Asn Trp His Ala Val Ser Thr Cys Ser Met
    530             535             540

Met Ser Arg Glu Leu Gly Gly Val Val Asp Ala Thr Ala Lys Val Tyr
545             550             555             560

Gly Thr Gln Gly Leu Arg Val Ile Asp Gly Ser Ile Pro Pro Thr Gln
            565             570             575

Val Ser Ser His Val Met Thr Val Phe Tyr Gly Met Ala Leu Arg Ile
            580             585             590

Ala Glu Ser Val Leu Glu Asp Tyr Ala Lys Ser Ala
        595             600
```

<210> SEQ ID NO 5
<211> LENGTH: 189

<212> TYPE: PRT
<213> ORGANISM: Saccharomyces cerevisiae
<220> FEATURE:
<223> OTHER INFORMATION: Thiolase - FAD-linked sulfhydryl oxidase Erv1p
      from Saccharomyces cerevisiae

<400> SEQUENCE: 5

```
Met Lys Ala Ile Asp Lys Met Thr Asp Asn Pro Pro Gln Glu Gly Leu
1               5                   10                  15

Ser Gly Arg Lys Ile Ile Tyr Asp Glu Asp Gly Lys Pro Cys Arg Ser
            20                  25                  30

Cys Asn Thr Leu Leu Asp Phe Gln Tyr Val Thr Gly Lys Ile Ser Asn
            35                  40                  45

Gly Leu Lys Asn Leu Ser Ser Asn Gly Lys Leu Ala Gly Thr Gly Ala
        50                  55                  60

Leu Thr Gly Glu Ala Ser Glu Leu Met Pro Gly Ser Arg Thr Tyr Arg
65                  70                  75                  80

Lys Val Asp Pro Pro Asp Val Glu Gln Leu Gly Arg Ser Ser Trp Thr
                85                  90                  95

Leu Leu His Ser Val Ala Ala Ser Tyr Pro Ala Gln Pro Thr Asp Gln
            100                 105                 110

Gln Lys Gly Glu Met Lys Gln Phe Leu Asn Ile Phe Ser His Ile Tyr
            115                 120                 125

Pro Cys Asn Trp Cys Ala Lys Asp Phe Glu Lys Tyr Ile Arg Glu Asn
        130                 135                 140

Ala Pro Gln Val Glu Ser Arg Glu Glu Leu Gly Arg Trp Met Cys Glu
145                 150                 155                 160

Ala His Asn Lys Val Asn Lys Lys Leu Arg Lys Pro Lys Phe Asp Cys
                165                 170                 175

Asn Phe Trp Glu Lys Arg Trp Lys Asp Gly Trp Asp Glu
            180                 185
```

<210> SEQ ID NO 6
<211> LENGTH: 400
<212> TYPE: PRT
<213> ORGANISM: Streptomyces mobaraensis
<220> FEATURE:
<223> OTHER INFORMATION: Sternzym PT 8001 - Transglutaminase from
      Streptomyces mobaraensis (Streptoverticillium mobaraense)

<400> SEQUENCE: 6

```
Phe Ala Thr Val Ser Ala Val Val Cys Thr Ala Gly Leu Met Pro Ser
1               5                   10                  15

Val Ser Gln Ala Ala Gly Asn Arg Glu Gly Glu Glu Lys Pro Ser Tyr
            20                  25                  30

Ala Glu Thr His Gly Leu Thr Ala Ala Asp Val Glu Asn Ile Asn Ala
        35                  40                  45

Leu Asn Glu Arg Ala Leu Thr Leu Gly Arg His Gly Ala Thr Pro Ser
    50                  55                  60

Phe Arg Ala Pro Asp Ser Ala Asn Val Arg Glu Thr Pro Pro Ala Glu
65                  70                  75                  80

Pro Leu Asp Arg Met Pro Asp Ala Tyr Arg Ala Arg Gly Gly Arg Ala
                85                  90                  95

Thr Thr Val Val Asn Asn Tyr Ile Arg Lys Trp Gln Gln Val Tyr Ser
            100                 105                 110

His Leu Asp Gly Lys Lys Gln Gln Met Thr Glu Glu Gln Arg Glu Lys
            115                 120                 125
```

-continued

```
Leu Ser Tyr Gly Cys Val Gly Val Thr Trp Val Asn Ser Gly Pro Tyr
    130             135                 140

Pro Thr Asn Arg Leu Ala Phe Ser Phe Phe Asp Glu Asp Lys Tyr Lys
145             150                 155                 160

Asn Asp Leu Lys Asn Thr Arg Pro Leu Ala Gly Glu Thr Arg Ala Glu
            165                 170                 175

Phe Glu Gly Arg Ile Ala Lys Ala Ser Phe Asp Glu Gly Lys Gly Phe
            180                 185                 190

Lys Arg Ala Arg Asp Val Ala Ser Ile Met Asn Lys Ala Leu Glu Asn
            195                 200                 205

Ala His Asp Glu Gly Ala Tyr Leu Asp Lys Leu Lys Thr Glu Leu Thr
    210             215                 220

Asn Asn Asn Asp Ala Leu Leu His Glu Asp Ser Arg Ser Asn Phe Tyr
225             230                 235                 240

Ser Ala Leu Arg Asn Thr Pro Ser Phe Lys Glu Arg Asp Gly Gly Asn
            245                 250                 255

Tyr Asp Pro Ser Arg Met Lys Ala Val Ile Tyr Ser Lys His Phe Trp
            260                 265                 270

Ser Gly Gln Asp Gln Arg Gly Ser Ser Asp Lys Arg Lys Tyr Gly Asp
            275                 280                 285

Pro Glu Ala Phe Arg Pro Asp Arg Gly Thr Gly Leu Val Asp Met Ser
    290             295                 300

Lys Asp Arg Asn Ile Pro Arg Ser Pro Ala Asn Pro Gly Glu Gly Trp
305             310                 315                 320

Val Asn Phe Asp Tyr Gly Trp Phe Gly Ala Gln Thr Glu Ala Asp Ala
            325                 330                 335

Asp Lys Thr Ile Trp Thr His Gly Asp His Tyr His Ala Pro Asn Gly
            340                 345                 350

Asp Leu Gly Pro Met His Val Tyr Glu Ser Lys Phe Arg Asn Trp Ser
    355             360                 365

Ala Gly Tyr Ala Asp Phe Asp Arg Gly Thr Tyr Met Ile Ala Leu Ile
    370             375                 380

Pro Lys Ser Trp Asn Thr Ala Pro Ala Lys Val Lys Gln Gly Trp Pro
385             390                 395                 400
```

```
<210> SEQ ID NO 7
<211> LENGTH: 616
<212> TYPE: PRT
<213> ORGANISM: Myceliophthera thermophile
<220> FEATURE:
<223> OTHER INFORMATION: Suberase - Extracellular laccase lcc1 from
      Myceliophthera thermophile

<400> SEQUENCE: 7
```

```
Met Lys Ser Phe Ile Ser Ala Ala Thr Leu Leu Val Gly Ile Leu Thr
1               5                   10                  15

Pro Ser Val Ala Ala Ala Pro Pro Ser Thr Pro Glu Gln Arg Asp Leu
            20                  25                  30

Leu Val Pro Ile Thr Glu Arg Glu Glu Ala Ala Val Lys Ala Arg Gln
        35                  40                  45

Gln Ser Cys Asn Thr Pro Ser Asn Arg Ala Cys Trp Thr Asp Gly Tyr
    50                  55                  60

Asp Ile Asn Thr Asp Tyr Glu Val Asp Ser Pro Asp Thr Gly Val Val
65              70                  75                  80

Arg Pro Tyr Thr Leu Thr Leu Thr Glu Val Asp Asn Trp Thr Gly Pro
            85                  90                  95
```

-continued

```
Asp Gly Val Val Lys Glu Lys Val Met Leu Val Asn Arg Pro Thr Ile
            100                 105                 110

Phe Ala Asp Trp Gly Asp Thr Ile Gln Val Thr Val Ile Asn Asn Leu
            115                 120                 125

Glu Thr Asn Gly Thr Ser Ile His Trp His Gly Leu His Gln Lys Gly
        130                 135                 140

Thr Asn Leu His Asp Gly Ala Asn Gly Ile Thr Glu Cys Pro Ile Pro
145                 150                 155                 160

Pro Lys Gly Gly Arg Lys Val Tyr Arg Phe Lys Ala Gln Gln Tyr Gly
                165                 170                 175

Thr Ser Trp Tyr His Ser His Phe Ser Ala Gln Tyr Gly Asn Gly Val
            180                 185                 190

Val Gly Ala Ile Gln Ile Asn Gly Pro Ala Ser Leu Pro Tyr Asp Thr
            195                 200                 205

Asp Leu Gly Val Phe Pro Ile Ser Asp Tyr Tyr Tyr Ser Ser Ala Asp
        210                 215                 220

Glu Leu Val Glu Leu Thr Lys Asn Ser Gly Ala Pro Phe Ser Asp Asn
225                 230                 235                 240

Val Leu Phe Asn Gly Thr Ala Lys His Pro Glu Thr Gly Glu Gly Glu
                245                 250                 255

Tyr Ala Asn Val Thr Leu Thr Pro Gly Arg Arg His Arg Leu Arg Leu
            260                 265                 270

Ile Asn Thr Ser Val Glu Asn His Phe Gln Val Ser Leu Val Asn His
            275                 280                 285

Thr Met Thr Ile Ile Ala Ala Asp Met Val Pro Val Asn Ala Met Thr
        290                 295                 300

Val Asp Ser Leu Phe Leu Gly Val Gly Gln Arg Tyr Asp Val Val Ile
305                 310                 315                 320

Glu Ala Ser Arg Thr Pro Gly Asn Tyr Trp Phe Asn Val Thr Phe Gly
                325                 330                 335

Gly Gly Leu Leu Cys Gly Gly Ser Arg Asn Pro Tyr Pro Ala Ala Ile
            340                 345                 350

Phe His Tyr Ala Gly Ala Pro Gly Gly Pro Pro Thr Asp Glu Gly Lys
            355                 360                 365

Ala Pro Val Asp His Asn Cys Leu Asp Leu Pro Asn Leu Lys Pro Val
        370                 375                 380

Val Ala Arg Asp Val Pro Leu Ser Gly Phe Ala Lys Arg Pro Asp Asn
385                 390                 395                 400

Thr Leu Asp Val Thr Leu Asp Thr Thr Gly Thr Pro Leu Phe Val Trp
                405                 410                 415

Lys Val Asn Gly Ser Ala Ile Asn Ile Asp Trp Gly Arg Pro Val Val
            420                 425                 430

Asp Tyr Val Leu Thr Gln Asn Thr Ser Phe Pro Pro Gly Tyr Asn Ile
            435                 440                 445

Val Glu Val Asn Gly Ala Asp Gln Trp Ser Tyr Trp Leu Ile Glu Asn
        450                 455                 460

Asp Pro Gly Ala Pro Phe Thr Leu Pro His Pro Met His Leu His Gly
465                 470                 475                 480

His Asp Phe Tyr Val Leu Gly Arg Ser Pro Asp Glu Ser Pro Ala Ser
                485                 490                 495

Asn Glu Arg His Val Phe Asp Pro Ala Arg Asp Ala Gly Leu Leu Ser
            500                 505                 510
```

-continued

```
Gly Ala Asn Pro Val Arg Arg Asp Val Thr Met Leu Pro Ala Phe Gly
        515             520             525

Trp Val Val Leu Ala Phe Arg Ala Asp Asn Pro Gly Ala Trp Leu Phe
    530             535             540

His Cys His Ile Ala Trp His Val Ser Gly Gly Leu Gly Val Val Tyr
545             550             555             560

Leu Glu Arg Ala Asp Asp Leu Arg Gly Ala Val Ser Asp Ala Asp Ala
            565             570             575

Asp Asp Leu Asp Arg Leu Cys Ala Asp Trp Arg His Tyr Trp Pro Thr
            580             585             590

Asn Pro Tyr Pro Lys Ser Asp Ser Gly Leu Lys His Arg Trp Val Glu
        595             600             605

Glu Gly Glu Trp Leu Val Lys Ala
    610             615
```

ENZYMATICALLY STABILIZED PASTA STRUCTURE AND METHOD OF PREPARING THE SAME

The present invention relates to the field of biodegradable, ecologically-friendly consumer goods. In particular, the invention provides a pasta structure comprising at least one enzyme capable of stabilizing the pasta structure, wherein the enzyme is selected from the group comprising a carboxylester hydrolase, a transglutaminase, an oxidase or an oxygenase. The enzyme may reduce or prevent the loss of starch from the pasta when the structure is contacted with water. The pasta structure is suitable for use as a food handling device and may e.g. have the shape of a straw, a bowl, a cup, a plate, a spoon, a fork, a knife, a jar, a funnel, a swizzle stick or a cone. It typically comprises water and wheat selected from the group comprising *Triticum aestivum, Triticum durum, Triticum dicoccum, Triticum spelta, Triticum monococcum* and a mixture thereof. The invention further provides a method of preparing said pasta structure and a use of at least one enzyme capable of stabilizing a pasta structure, wherein the at least one enzyme is selected from the group comprising a carboxylester hydrolase, a transglutaminase, an oxidase or an oxygenase, for stabilizing the pasta structure. Finally, use of the pasta structure as a food handling device is disclosed, preferably as a drinking straw.

The pollution of our environment with plastic waste constitutes one of the biggest challenges of our time. According to numbers released by the European Parliament, the yearly world-wide plastic production has increased from 1.5 million tonnes in 1950 to 322 million tonnes in 2015. (www.europarl.europa.eu/news/en/headlines/society/20181212STO21610/plastic-waste-and-recycling-in-the-eu-facts-and-figures). The total amount of plastic produced in this 65-year period is estimated at 8.3 billion tonnes. 22% of the prepared plastic is used for consumer and household items. A study conducted by the Heinrich-Böll-Stiftung in cooperation with the Bund für Umwelt and Naturschutz Deutschland (BUND) concluded that in Germany alone, each person produces 38 kg plastic waste per year (www.bund.net/fileadmin/user_upload_bund/publikationen/chemie/chemie_plastikatlas_2019.pdf). Less than a third of the plastic waste in Europe is recycled. However, plastic recycling itself faces several challenges. For instance, the diversity of plastics that are often customized to the particular needs of manufacturers complicates the recycling process, making it costly and affecting the quality of the end product (www.europarl.eu-ropa.eu/news/en/headlines/society/20181212STO21610/plastic-waste-and-recycling-in-the-eu-facts-and-figures). Therefore, the vast majority of the world-wide plastic waste is disposed of after single use. However, plastic takes hundreds of years to biodegrade and the resulting microplastics contribute to environmental damage, especially in the marine ecosystem, as approximately 4-12 million tonnes of plastic waste enter the oceans every year. Recently, scientists from the University of Manchester analyzed the amount of microplastic in the Thyrenian Sea and detected microplastics in every seafloor sample taken, with microplastic concentrations reaching up to 1.9 million pieces per square meter (Kane et al., 2020. Seafloor microplastic hotspots controlled by deep-sea circulation. Science 368(6495), 1140-1145).

These and other alarming figures have, however, initiated a slow rethinking among many consumers and companies. Consequently, environmentally friendly alternatives to products made of plastic are in great demand. Some governments have already banned the use of e.g. plastic drinking straws. The European Union decided to ban cutlery, tableware, straws and cotton buds made from plastic as well as food packaging made of polystyrene starting from July, 2021. Even large fast-food chains have recognized this development and started to prohibit the use of plastic straws in many of their restaurants.

A large number of environmentally friendly and oftentimes reusable alternatives have been developed for many of the above mentioned plastic objects, including biodegradable cutlery made of wood, bamboo or bioplastic. Drinking straws may be made of paper, glass, stainless steel, bamboo or even actual straw. Wisefood offers edible straws, spoons and swizzle sticks made of grain, apple fibers and stevia (www.wisefood.eu). However, many of these ecological alternatives are associated with drawbacks. Straws made of paper are becoming increasingly popular, but lose their stability very quickly when used. Reusable items made of metal, glass or bamboo on the other hand are relatively expensive and make it necessary for the user to have the aid with him at all times and to wash it after each use. Alternatively, fast-food restaurants would have to provide these items and clean them after each customer, which would result in high costs and an increased energy consumption. Finally, many of the proposed alternatives to plastic often exhibit an unpleasant taste of their own and could thus be rejected by customers.

Childhood experience suggests the use of hollow noodles as drinking straws.

This has been taken up, for example, by AU 2018101026, which describes a straight or bent straw of wheat or gluten-free material. The straw may come in different shapes and flavors and is intended to be completely edible.

WO 2020/069587 teaches the production of a drinking straw made of durum wheat. Pasta made from durum wheat (*Triticum durum*) is generally characterized by a higher resistance to cooking water compared to pasta made from *Triticum aestivum*.

Similar pasta straws made of durum wheat are commercially available from various websites e.g., makkaroni-strohhalme-kaufen.de, www.sausalitos.de/shop/sausaroni-pasta-strohhalme~p44976, www.vomfass.de/pasta-strohhalme, www.pastastraws.org, stroodles.co.uk or www.drinkstuff.com/products/product.asp?ID=27441.

The pasta straws disclosed in AU 2018101026 and WO2020/069587 or sold on the internet usually last for approximately one hour in a cold beverage kept at room temperature before losing their stability and starting to become soft. While a period of one hour may be considered long enough to finish a normal glass of water or a soft drink, the consumption of a large and calorie-rich cocktail or milkshake on convivial occasions can, however, easily exceed this period. In consequence, the straw made of pasta eventually starts to break and clog, which will significantly reduce the drinking pleasure for the consumer.

To improve its moisture resistance, WO2020/044049 therefore suggested treating a pasta straw with an edible wax. The wax should be incorporated into the pasta dough. This requires quite high amounts of wax to be added, which leads to higher costs. In addition, the product no longer corresponds to classic pasta products in its composition.

Collectively, although a growing number of customers has developed an increased environmental awareness and thus wants to reduce their consumption of products made of plastic, many of the existing alternatives are either comparably expensive or lack the stability and durability of familiar plastic items. Also, even many so-called biodegradable items made of paper or biodegradable plastic may still take months or even years until they are fully degraded. Even though straws made of pasta are becoming more and more popular due to their neutral taste and the possibility to modify their appearance by use of e.g. food colorants, the low water-resistance of dry pasta limits the time period the straws may be used. For the same reason, dry pasta usually is not used for manufacturing other food handling devices such as cutlery or plates. Therefore, there is a demand for environmentally friendly and rapidly degradable food handling devices that can be cheaply produced while meeting the expectations of costumers with regard to stability and moisture-resistance. This problem is solved by the present invention, especially by the subject matter of the claims.

The present invention provides a pasta structure comprising at least one enzyme capable of stabilizing the pasta structure, wherein the enzyme is selected from the group comprising a carboxylester hydrolase, a transglutaminase, an oxidase or an oxygenase.

In the context of the invention, the term structure is intended to refer to a shaped or formed article or component thereof, i.e. an object or part thereof which has been formed, e.g., extruded, moulded, kneaded, pressed, pulled, rolled, blown, cut or punched out into a desired shape, preferably, pressed. The structure may thus also be, e.g., a moulded article. Preferably, the shaped pasta structure is a food-handling device.

The pasta structure may, e.g., be selected from the group comprising a straw, a bowl, a cup, a plate, a spoon, a fork, a knife, a jar, a cone, a funnel and a swizzle stick. Preferably, the pasta structure is a straw, wherein the straw is usable for drinking a beverage, i.e., a drinking straw. In its simplest form, the straw has a cylindrical shape and is hollow inside to allow the passage of a liquid, i.e., it is a rigid tube formed of pasta. The drinking straw may preferably have a length of 5-30 cm, e.g., of about 10 cm, about 15 cm or about 20 cm and a total diameter of 3-15 mm, preferably of 5-12 mm, most preferably of about 10 mm. It may be a straight straw. Alternatively, it may also comprise a bend to facilitate the drinking process.

The structure according to the invention, i.e., the food-handling device, is preferably made from pasta and consists of pasta. Alternatively, it may also comprise pasta in combination with at least one other component. Pasta is the Italian designation for a noodle rich in starch that is usually prepared from a dough comprising wheat semolina and water. In some recipes, the dough may further comprise eggs. Pasta may exist both in fresh (pasta fresca) and in dried form (pasta secca). The pasta structure of the invention typically is dry pasta. According to the Encyclopedia of Pasta released by the University of California Press, there are more than 300 officially listed shapes of pasta (Zanini de Vita, O., 2009. Encyclopedia of pasta, Volume 26, University of California Press). Therefore, pasta dough constitutes an excellent basic substance for forming or shaping a pasta structure into any of the objects or articles listed above.

The pasta structure of the invention typically comprises water and wheat selected from the group comprising *Triticum aestivum, Triticum durum, Triticum dicoccum, Triticum spelta, Triticum monococcum* and a mixture thereof. Alternatively, it may also comprise other cereal products, e.g., barley, rye, rice, corn, sorghum, teff, ricegrass, quinoa, chia, oats, millet or amaranth as well as products from other food plants such as beans, peas, lentils, buckwheat, linseed, sweet potato, potato, arrowroot, cassava or a combination thereof. *Triticum aestivum*, better known as common wheat or bread wheat, constitutes approximately 90% of the globally produced wheat. In the context of the invention, it is also referred to as soft wheat (in contrast to durum—hard—wheat). *T. aestivum* can also be used for products other than bread, cake, cookies, biscuits and crackers. It is a hexaploid wheat species and contains on average about 11% protein (dry weight) (Zilic et al., 2011. Characterization of proteins from grain of different bread and durum wheat genotypes. Int. J. Mol. Sci. 12(9), 5878-5894). Gluten constitutes about 75-85% of said total grain proteins and stores carbon, nitrogen and sulphur to support seed germination. Gluten is a protein mixture composed of prolamins and glutelines, which, in the context of wheat, are usually referred to as gliadins and glutenins, respectively. Glutenins form protein aggregates stabilized via intermolecular disulfide bonds that become attached to the monomeric gliadins. Collectively, gluten proteins form a matrix with viscoelastic and adhesive properties (Shewry et al., 2002. The structure and properties of gluten: an elastic protein from wheat grain. Phil. Trans. R. Soc. Lond. 357, 133-142). *T. aestivum* carries rather soft grains that can be conveniently milled into fine flour. As a result, the gluten networks become exposed and can be easily brought together during the mixing and kneading of the dough, thereby creating new protein-protein interactions within the growing gluten network. Accordingly, doughs prepared from *T. aestivum* are usually high in strength and elasticity and are therefore preferred for bread making.

Traditionally, the wheat species used for preparing pasta dough is *Triticum durum*. *T. durum* is a tetraploid wheat species, probably derived from the tetraploid species *Triticum dicoccum*, and the second most cultivated species of wheat after *T. aestivum*. The Latin name Durum translates as hard, as the grains of *T. durum* are known for being highly resistant to milling. *T. durum* is therefore mostly processed into more coarse-grained semolina rather than into fine flour. *T. durum* is described to contain slightly higher levels of gluten compared to *T. aestivum* (Zilic et al., 2011). However, because the gluten- and starch-rich endosperms are often only partly cracked in Durum semolina, the gluten is less readily available. Accordingly, dough made from *T. durum* is only rarely used for baking bread and is instead particularly suitable for making pasta, as its lower elasticity facilitates easier shaping and cutting.

*Triticum dicoccum*, better known as emmer wheat or hulled wheat, is considered to be one of the oldest domesticated crop species. Emmer is a particular stress-resistant wheat and therefore can grow on comparably poor soils. Similar to *T. durum*, emmer possesses relatively hard grains. Emmer wheat is most famously employed in the production of a particular type of Italian bread (pane di farro), but may also be used for garnishing soups or for preparing beer.

*Triticum spelta*, also referred to as spelt or dinkel wheat, is another relict crop, which enjoys growing popularity among more health-oriented consumers. Spelt is a hexaploid wheat and is most commonly used for baking breads, rolls and other pastries. It may also be employed in beer brewing or for the distillation of spirits.

Similar to emmer and spelt, *Triticum monococcum* (einkorn wheat) is an ancient wheat and is characterized by a high protein and fat content. It is commonly consumed in Provence, France and may be used as an ingredient of bulgur.

Emmer, spelt or einkorn wheat are suitable for being processed into pasta. However, pasta products made from these wheat species merely represent niche products that are sold at a comparably high price. In the present invention, the preferred wheat species used for preparing the pasta structure preferably is *Triticum aestivum*. *T. aestivum* is by far the most cultivated wheat species in the world, and it is therefore considerably cheaper and far more available than *T. durum, T. dicoccum, T. spelta* and *T. monococcum*. Accordingly, using *T. aestivum* for producing the pasta structure thus reduces production costs and results in a final product that may be sold at a lower price. The inventors found that pasta structures can be advantageously prepared using a combination of *T. aestivum* and the enzyme as described herein for the preparation of pasta structures, without addition of other cereal components such as *T. durum*. In particularly, the pasta structures formed are very stable and can advantageously be used as food handling devices, e.g., as straws.

However, the inventors found out that stability of pasta structures made from *T. durum* is also improved by the combination with the enzyme. Thus, the pasta structure may comprise *T. durum*, e.g., it may comprise a mixture of *T. aestivum* and *T. durum*. Preferably, the pasta structure comprises more *T. aestivum* than *T. durum*. The percentage of *T. aestivum* in the pasta dough may be, e.g., 0-100%, e.g., 90-100%, 80-90%, 70-80%, 60-70%, 50-60%, with *T. durum* ad 100%. % refers to a weight per weight ratio (wt/wt) unless otherwise mentioned. In other embodiments, the pasta structure may however also comprise more *T. durum* than *T. aestivum*, i.e., the percentage of *T. aestivum* being 40-50%, 30-20%, 20-30%, 10-20% or 0-10%, with *T. durum* ad 100%. It may also comprise only *T. durum* and no *T. aestivum*.

The pasta of the invention may also comprise one or more of *T. dicoccum, T. spelta* and/or *T. monococcum*. The pasta may therefore also have a *T. dicoccum, T. spelta* and/or *T. monococcum* content of, e.g., 0-100%, e.g., 90-100%, 80-89%, 70-80%, 60-70%, 50-60%, 40-50%, 30-40%, 20-30%, 10-20% or 0-10%, with any other of the herein described wheat species described herein, e.g., *T. aestivum*, ad 100%.

The wheat product used for preparing the pasta dough may be flour, semolina or a mixture thereof.

Flour refers to a fine powder obtainable by grinding or milling raw wheat grains to a particle size of preferably approx. 100 to 250 μm. Smaller particles may also be contained. Cereal flour may either be whole grain, i.e., it may be prepared from the endosperm, germ and bran together, or it may be a refined flour, i.e., it may be prepared only or partly from the starch-rich endosperm. Typically, for use of the pasta structure as a food-handling device, refined flour prepared from the endosperm is preferred, e.g., corresponding to Type 550 (DIN-Norm 10355, 1992), because it is cheaper than most other flour types due to its common use a bread flour.

Semolina refers to the coarse, purified wheat midlings usually obtainable from milling hard wheat species, e.g. *T. durum*. During semolina production, the bran and germ of the wheat are flaked-off, while the starch-rich endosperm is cracked into coarse fragments. These endosperm pieces form the actual semolina when separated from the bran. The semolina can optionally be further ground into finer particles to produce flour.

The average particle size of semolina and flour may vary considerably depending on the employed milling technique and the type of wheat used. However, the mean particle size of semolina, e.g., from *T. durum*, is commonly in the range of more than 250 μm to about 750 μm (en.wikipedia.org/wiki/Semolina; Sacchetti et al., 2011. Effect of semolina particle size on the cooking kinetics and quality of spaghetti. Proc. Food Sci. 1, 1740-1745).

The mean particle size is preferably analyzed by sieving using, e.g., a test sieve shaker such as a Ro-Tap® (www.haverparticleanalysis.com/en/sieve-analysis/ro-tapr-test-sieve-shaker/), Vibratory Sieve Shaker AS 200 Control (www.retsch.com/products/sieving/sieve-shakers/as-200-control/function-features/) or an air jet sieve such as the Laboratory Air-jet Lab sieve KLS (gkm-net.de/en/laboratory-air-jet-lab-sieves.html). Alternatively, particle size may also be determined by laser diffraction or spectrometry (Hareland, G. A., 1994. Evaluation of flour particle size distribution by laser diffraction, sieve analysis and near-infrared reflectance spectroscopy. J. Cereal Sci. 20(2), 183-190).

In one embodiment, the wheat used for preparing the pasta dough is provided as flour with an average particle size of less than 250 μm, preferably less than 200 μm, less than 175 μm or less than 150 μm, more preferably less than 125 μm, less than 110 μm or less than 100 μm. The finer the particle size of the ground wheat, the larger the reaction surface for the enzyme present in the pasta structure, which is advantageous. E.g., at least 50%, preferably at least 75%, at least 80%, at least 85%, at least 90%, at least 95%, at least 96%, at least 97%, at least 98% or at least 99% of the wheat is provided as flour e.g., as defined herein. Optionally, 100% of the wheat used for preparing the pasta dough is provided as flour. Accordingly, typically, less than 50%, preferably, less than 25%, less than 20%, less than 15%, less than 10%, less than 5%, less than 4%, less than 3%, less than 2% or less than 1% of the wheat are provided as semolina. Optionally, the wheat product used for preparing the pasta dough does not comprise any semolina at all.

In an alternative embodiment, the proportion of semolina is higher, e.g., at least 25%. It may for instances constitute at least 30%, at least 35%, at least 40%, at least 45% or at least 50% of the wheat used for preparing the pasta dough. In some embodiments, the majority of the wheat used for preparing the pasta dough may be provided as semolina, e.g. at least 60%, at least 70%, at least 80%, at least 90%, at least 95%, at last 95%, at least 96%, at least 97%, at least 98% or at least 99%. Optionally, the entire wheat used for preparing the pasta dough is provided as semolina. Preferably, the semolina used for the pasta dough of the invention has an average particle size not larger than 500 μm, more preferably, smaller than 450 μm, smaller than 400 μm, smaller than 350 μm, smaller than 300 μm, or smaller than 275 μm.

The pasta structure of the present invention further comprises an enzyme capable of stabilizing the pasta structure, preferably added to the flour or into the dough prior to forming the structure.

Enzymes have been previously used to reduce stickiness of cooked pasta made from *T. aestivum* (www.prvhh.de/newsroom/muehlenchemie/de/pressemeldung/news/detail/News/pastazym-pd-erzielt-starke-verbesserung-der-koch-toleranz-von-pasta/).

However, in the context of the present invention, it has been found that the enzyme surprisingly also increases stability of the uncooked pasta structure, and thus prevents the uncooked pasta structure from losing its structural integrity, especially when brought into contact with a liquid, preferably cold water. The pasta structure of the invention thus is an uncooked or raw pasta structure.

The stability, including the mechanical strength of a pasta structure, may be defined by its ability to withstand an externally applied mechanical force. This may be directly tested, for example, with the help of a measuring knife or stamp made of e.g. plastic, aluminum or steel, which penetrates or compresses the pasta structure at a defined path length (cf. e.g. texturetechnologies.com/industries/food-tex-
ture-analysis/pasta#:~:
text=XTPlus%20Texture%20Analyzer%20is%20accurate,
will%20accept%20your%20test%20results). The higher the
stability or strength of the pasta structure, the more mechani-
cal force is required to penetrate the pasta with a blade or
press the pasta with the stamp through a die. Prolonged
exposure to water continuously softens the dry pasta and
thus reduces the force needed to penetrate or compress the
pasta. The mechanical strength can be tested in the presence
or absence of water, particularly, cold water having room
temperature (i.e., 25° C.) or less. The inventors found that
the enzymes as defined herein increase the stability and
mechanical strength of the pasta structure exposed to water,
e.g., as measured with the help of a measuring stamp or
blade (or, preferably, both). More details of the analysis are
described in the examples below.

Another characteristic associated with decreasing stability
of pasta in the presence of water is the continuous loss of
starch from the pasta matrix into the surrounding medium.
Accordingly, the stability, including the structural integrity
of the pasta structure, may also be tested by measuring the
amount of starch that is washed out when the pasta is
submerged in water (typically, cold water having room
temperature, i.e., 25° C. or less). This can simply be done by
observing the continuously increasing turbidity of the water
comprising the pasta over a certain time period, e.g., 30 or
60 min. Alternatively and preferably, the increasing loss of
starch from the pasta into the surrounding water can be
demonstrated chemically, e.g. through the addition of
Lugol's solution, as shown in the examples below. Lugol's
solution reacts with the dissolved starch and leads to the
formation of dark inclusion compounds, a reaction that is the
stronger the more starch is released into the water. The
inventors found that the enzymes as defined herein increase
the stability and the integrity of the pasta structure, e.g., as
measured based on detection of the starch loss from the pasta
matrix. The inventors found that pasta comprising a car-
boxylester hydrolase, a transglutaminase, an oxidase and/or
an oxygenase advantageously has such increased stability.
The pasta structures of the invention retained comparably
high resistance to mechanical stress after extended immer-
sion in water, in particular water with a temperature lower
than room temperature (i.e., 25° C.). Adding any of the
above enzymes to the pasta dough also significantly
decreased the loss of starch from the pasta structure in the
presence of water. Therefore, the enzymes are able to
stabilize the pasta structure according to at least one of the
two assays described herein. In a particular preferred
embodiment, the pasta structure comprising the at least
enzyme should exhibit both prolonged mechanical resis-
tance to an external force as well as reduced starch loss in
the presence of water when compared to an equivalent pasta
structure lacking said enzyme.

Thus, advantageously, the pasta structure is stabilized
compared to a pasta structure not comprising the enzyme,
when in contact with a water-containing liquid, in particular,
a beverage selected from the group comprising water, milk,
a fruit juice, a soft drink such as coke or lemonade, a
milkshake, a smoothie, an ice tea, a non-alcoholic cocktail
or an alcoholic beverage such as a cocktail. The enzyme of
the invention also stabilizes the pasta structure in the pres-
ence of a food containing a liquid, e.g., water, such as a soup,
yoghurt, ice cream, pudding, cottage cheese, skyr, milk rice,
porridge, a sauce, cream or fresh cheese, wherein the food
preferably is cold food.

Preferably, the liquid or food according to the invention is
a cold liquid or cold food, e.g. a liquid or a food with a
temperature not higher than 30° C., preferably not higher
than room temperature (about 25° C.). Preferably, the liquid
or food according to the invention has a temperature below
room temperature, e.g., between 0 and 20° C. Temperatures
in this range will prevent the denaturation of proteins that
form the matrix of the pasta dough and limit the degree of
starch gelatinization, i.e., the process of starch dissolution in
water. However, the enzyme of the invention may addition-
ally be able to stabilize the pasta structure in the presence of
a hot liquid or a hot beverage, i.e., a liquid or beverage with
a temperature higher than 30° C., e.g., at least 35° C., at least
40° C., at least 45° C., at least 50° C., at least 55° C., at least
60° C., at least 65° C., at least 70° C. or at least 75° C.
However, the stability of the pasta structure will decline
more rapidly in the presence of hot liquids or foods than in
the presence of cold liquids or foods.

Due to the activity of the enzyme, the pasta structure of
the invention may remain in a cold liquid or food as defined
herein for extended periods of time before becoming
instable and thus unsuitable for use as a food handling
device, e.g., a straw, according to at least one of the assays
described herein. The pasta structure according to the inven-
tion may retain its stability in a liquid (e.g., water) for at least
1-3 h, e.g., at least 1.5 h, at least 2 h, or at least 2.5 h. In the
presence of a food, the pasta structure may retain its stability
for even longer time periods, e.g. for at least 2-4 h, e.g. at
least 3 h, or at least 3.5 h.

Addition of the enzyme to the dough of the pasta structure
according to the invention may increase the firmness or
mechanical strength of pasta in the presence of water within
the first 30 min by at least 5%, preferably at least 10%, at
least 15%, or at least 20%. This can be tested by subse-
quently subjecting the pasta structure to mechanical stress as
described above or in the example below.

The stability or strength of the pasta structure depends on
the integrity of the pasta matrix. The term pasta matrix is
intended to relate to the structural network, which is mainly
formed by proteins such as gluten as well as the starch
present in wheat. The pasta matrix is considered strong if,
e.g., the structural protein network of the pasta is very dense,
i.e. when it comprises multiple cross-links between indi-
vidual proteins or protein aggregates.

A high stability of the pasta structure is further ensured if
the starch present in the pasta matrix is protected from
undergoing swelling and gelatinization in water. Starch is a
polymer formed by the highly branched amylopectin and
linear amylose. Both molecules are polysaccharides formed
by large numbers of D-glucose units linked together via
1,4-alpha glyosidic bonds. The branched amylopectin fur-
thermore comprises 1,6-alpha glycosidic bonds at every
$24^{th}$-$30^{th}$ glucose unit. Starch molecules arrange themselves
in semicrystalline granules inside the plant. When preparing
dough from wheat, starch acts not only as a filler in the
continuous matrix of the dough, but also appears to form a
bi-continuous network with proteins (Horstmann et al.,
2017. Starch characteristics linked to gluten-free products.
Foods 6(4), 29-50). When dried pasta is brought into contact
with e.g. cold water, it absorbs water and starts to swell. In
addition, intermolecular bonds of starch molecules will
break down, the starch dissolves and is progressively
washed out of the pasta matrix. Loss of starch from the
matrix reduces the stability of the pasta structure, and
ultimately softens it.

This process will be accelerated by high temperatures.
The enzyme according to the present invention may be capable of reducing or preventing the loss of starch from the pasta when the structure is contacted with water, e.g., as described herein.

In the context of the invention, the phrase "reducing the loss of starch" means that the activity of the enzyme present in the pasta structure results in modifications of the pasta matrix that effectively limit the amount of starch washed out of the pasta structure. When contacted with e.g. water, the loss of starch from the pasta structure comprising the enzyme may be reduced by at least 15%, at least 20%, at least 25%, at least 30%, at least 35%, at least 40%, at least 45% or, preferably, at least 50% compared to the starch loss of an equivalent pasta structure lacking the enzyme. The reduction of starch loss as described herein may be even as much as 55%, 60%, 70%, 80% or 90%.

In one embodiment, the inventors found an increase in stability of the pasta structure exposed to water when the pasta comprises at least one enzyme that is a carboxylester hydrolase.

Carboxylester hydrolases (also known as carboxylic ester hydrolases) are enzymes that catalyze the hydrolysis of carboxylic esters into alcohols and carboxylic acids. Representatives of this class of enzymes are lipases, which catalyze the hydrolysis of fats (lipids) into their basic components, e.g. triacylglycerol lipases (EC 3.1.1.1), phospholipases (EC 3.1.1.4, EC 3.1.1.32) or galactolipases (EC 3.1.1.26).

Besides protein and starch, wheat comprises a variety of lipids. The majority of lipids in wheat are esters formed by glycerol and fatty acids. These so-called glycerolipids may be triglycerides, mono- and di-galactosyldiglycerides, phospholipids such as N-acylphosphatidylethanolamine, phosphatidylethanolamine, phosphatidylglycerol, or phosphatidylcholine, diglycerides or mono acyl glycerides. Other lipids that can be found in wheat are free fatty acids as well as sterol-based lipids and glycosphingolipids (Morrison, W. R., 1994. Wheat lipids: structure and functionality. Bushuk W., Rasper V. F. (eds) Wheat. Springer). Without intending to be bound by the theory, upon addition to the pasta dough, triacylglycerol lipases may interact with the acylglycerides present in the dough and catalyze their hydrolysis into fatty acids as well as partial glycerides, i.e., mono- and diglycerides. These partial glycerides act as emulsifiers, i.e., they possess a polar or hydrophilic part and a non-polar or hydrophobic part. Phospholipases and galactolipases likewise split off fatty acids, which are highly hydrophobic, from the corresponding polar lipids, hence increasing the polarity of the remaining phospholipid or galactolipid. The resulting lyso-lipids and partial glycerides may subsequently interact with the starch within the pasta dough and are capable of delaying its gelatinization and therefore the loss of starch from the pasta matrix in the presence of e.g. water. Furthermore, fatty acids also tend to react with the hydrophobic regions of helical starch molecules, altering their pasting properties (Kibar et al., 2014. Effects of fatty acid addition on the physicochemical properties of corn starch. Int. J. Food Prop. 17(1), 204-218). In addition, partial glycerides may also interact with gluten to promote aggregation and crosslinking of the protein matrix, which further prevents the release of starch from the pasta into the surrounding liquid. A denser protein matrix may also reduce the uptake of e.g. water by the starch and thus suppress its swelling.

Therefore, the carboxylester hydrolase of the present invention preferably is a lipase capable of hydrolyzing lipids into fatty acids and mono- or diglycerides, or a phospholipase capable of hydrolyzing diacyl-phospholipids into fatty acids and monoacyl-phospholipids, or a galactolipase capable of hydrolyzing diacyl monogalactosides or diacyl digalactosides into the corresponding monoacyl galactosides.

Preferably, the enzyme of the invention comprises an amino acid sequence having SEQ ID NO: 1. Such an enzyme is commercially available as "Pastazym Duo Pure" from Mühlenchemie GmbH & Co. KG. The enzyme may also comprise an amino acid sequence having at least 80%, at least 85%, at least 90%, at least 95%, at least 96%, at least 97%, at least 98%, or at least 99% sequence identity to SEQ ID NO: 1, wherein the enzyme is capable of hydrolyzing lipids in pasta dough, e.g., as defined herein. The enzyme may also consist of SEQ ID NO: 1.

Alternatively, the enzyme of the invention comprises an amino acid sequence having SEQ ID NO: 2. Such an enzyme is commercially available as "Pastazym Superflex" from Mühlenchemie GmbH & Co. KG. The enzyme may also comprise an amino acid sequence having at least 80%, at least 85%, at least 90%, at least 95%, at least 96%, at least 97%, at least 98%, or at least 99% sequence identity to SEQ ID NO: 2, wherein the enzyme is also capable of hydrolyzing lipids in pasta dough, e.g., as defined herein. The enzyme may also consist of SEQ ID NO: 2.

In an alternative embodiment, the enzyme of the invention may be an oxidase selected from the group comprising a glucose oxidase and a sulfhydryl oxidase. These enzymes have also been found to stabilize the pasta structure of the invention.

The name oxidase refers to enzymes capable of catalyzing oxidation-reduction reactions. The enzyme glucose oxidase was found to be capable of strengthening the gluten network in dough prepared from wheat. Glucose oxidase can catalyze the oxidation of D-glucose into gluconic acid and $H_2O_2$. The $H_2O_2$ in turn oxidizes thiol groups, in particular of glutenin proteins, to create new disulphide crosslinks. To catalyze these reactions, glucose oxidases require $O_2$, which is both naturally present in wheat flour but is also introduced into the dough during mixing (Meerts et al., 2017. Enhancing the rheological performance of wheat flour dough with glucose oxidase, transglutaminase or supplementary gluten. Food Bioproc. Technol. 10(12), 2188-2198).

Accordingly, the enzyme of the invention may comprise an amino acid sequence having SEQ ID NO: 3 or SEQ ID NO: 4. An exemplary suitable enzyme of SEQ ID NO: 3 is commercially available as "Sternzym Gloxy", and of SEQ ID NO: 4 as "Sternzym Gloxy TGO", both from SternEnzym GmbH & Co. KG. The enzyme may also comprise an amino acid sequence having at least 80%, at least 85%, at least 90%, at least 95%, at least 96%, at least 97%, at least 98%, or at least 99% sequence identity to either SEQ ID NO: 3 or SEQ ID NO: 4, wherein the enzyme is also capable of strengthening the protein matrix of pasta dough, in particular via catalyzing the formation of disulphide crosslinks, e.g., as defined herein. The enzyme may also consist of SEQ ID NO: 3 or 4.

Similar to glucose oxidase, sulfhydryl oxidase uses molecular oxygen as electron acceptor to oxidize free thiol groups in proteins, promoting the formation of disulfide bonds.

Therefore, the enzyme of the invention may also comprise an amino acid sequence having SEQ ID NO: 5. Such an enzyme is commercially available as "Thiolase" from SternEnzym GmbH & Co. KG. The enzyme may also comprise an amino acid sequence having at least 80%, at least 85%, at least 90%, at least 95%, at least 96%, at least 97%, at least 98%, or at least 99% sequence identity to SEQ ID NO: 5, wherein the enzyme is also capable of strengthening the protein matrix of pasta dough, in particular via catalyzing the formation of disulphide crosslinks, e.g., as defined herein. The enzyme may also consist of SEQ ID NO: 5.

Transglutaminases have also been found to stabilize pasta structures of the invention. Thus, the enzyme of the invention may also be a transglutaminase.

The enzyme transglutaminase catalyzes the acyl-transfer reaction between ε-amino groups of peptide-bound lysine residues and the γ-carboxyamide group of peptide-bound glutamine residues. In consequence individual gluten chains may become permanently cross-linked via iso-peptide bonds (Meerts et al., 2017).

Therefore, the enzyme of the invention may also comprise an amino acid sequence having SEQ ID NO: 6. Such an enzyme is commercially available as "Sternzym PT 8001" from SternEnzym GmbH & Co. KG. The enzyme may also comprise an amino acid sequence having at least 80%, at least 85%, at least 90%, at least 95%, at least 96%, at least 97%, at least 98%, or at least 99% sequence identity to SEQ ID NO: 6, wherein the enzyme is also capable of strengthening the protein matrix of the pasta dough, in particular via catalyzing the formation of iso-peptide crosslinks, e.g., as defined herein. The enzyme may also consist of SEQ ID NO: 6.

Oxygenases have also been found to stabilize pasta structures of the invention. Thus, the least one enzyme of the invention is an oxygenase, e.g., a laccase.

Oxygenases oxidize their substrates by transferring oxygen atoms to them. Laccases are capable of oxidizing a large variety of aromatic compounds. The reaction products of laccases often continue to react non-enzymatically; accordingly, laccase favors the generation of polymers. Without intending to be bound by the theory, when added to dough containing wheat, laccase presumably catalyzes the formation of crosslinks between non-starch polysaccharides, such as ferulic acid-substituted arabinoxylan hemicellulose, which results in arabinoxylan network formation and thus improved dough resistance. In addition, laccase may oxidize the tyrosyl residues of gluten proteins or enhance the disulphide bridge formation in gluten polymers via ferulic acid-derived radicals. In consequence, protein aggregation in the dough is increased (Selinheimo, E., 2008. Tyrosinase and laccase as novel crosslinking tools for food biopolymers, PhD Thesis, VTT publications, 693).

Therefore, the enzyme of the invention may also comprise an amino acid sequence having SEQ ID NO: 7. Such an enzyme is commercially available as "Suberase" from Novozymes A/S. The enzyme may also comprise an amino acid sequencing having at least 80%, at least 85%, at least 90%, at least 95%, at least 96%, at least 97%, at least 98%, or at least 99% sequence identity to SEQ ID NO: 6, wherein the enzyme is also capable of strengthening the protein matrix of pasta dough and catalyzing the formation of an arabinoxylan network, e.g., as defined herein. The enzyme may also consist of SEQ ID NO: 7.

The enzyme of the invention may also be an enzyme other than a carboxylester hydrolase, oxidase, transglutaminase or oxygenase, as long as it is capable of reducing or preventing the loss of starch from the pasta when the pasta structure is contacted with water. However, preferably, said enzyme of the invention is a lipase. In another embodiment, the pasta structure may comprise a combination of any of the herein described enzymes. For instance, the pasta structure may comprise a lipase having at least 80% sequence identity to SEQ ID NO: 1 and a glucose oxidase having at least 80% sequence identity to SEQ ID NO: 3. The pasta structure may also comprise a combination of more than 2 different enzymes, e.g., at least 3, at least 4, or at least 5 different enzymes.

The enzyme of the invention may be present in the final dried pasta structure at a concentration of 1-500 mg/kg, preferably of 10-400 mg/kg, and more preferably 50-300 mg/kg. In a particularly preferred embodiment, the concentration of the enzyme in the dried pasta structure is about 100 mg/kg. The term "about" is intended to mean +/−10% in the context of the present invention.

The chemical reaction catalyzed by the enzyme of the invention requires the presence of water to occur. Therefore, prior to drying, the freshly prepared pasta dough comprising the enzyme preferably has an initial water content of 20-40% (wt/wt), preferably 25-35%. Most preferably, the water content of the pasta dough prior to drying is 30-33%, e.g., about 31%, as described in the example below.

After forming the freshly prepared pasta dough into the desired, herein defined shape, the resulting pasta structure is dried so that it is suitable for the use as, e.g., a food handling device according to the invention. Therefore, typically, the pasta of the final pasta structure is dry (i.e., dried) pasta, i.e. it has a water content of 12.5% or less.

The final water content of the dry pasta structure should not be higher than 14%, because otherwise, the pasta structure would lack the required stability and would be prone to deformation or tearing. In addition, a water content higher than 14% in the final pasta structure may increase the risk of mold growth. On the other hand, if the water content of the dry pasta structure were too low, the structure would be too brittle for use as a food handling device.

Accordingly, the dry pasta structure preferably has a water content of 5-14%, e.g., of 10-13% or about 12% as described in the example below.

The dried pasta structure may be stored at room temperature, i.e. at about 23° C. for at least 6 months, at least 1 year, at least 1.5 years, at least 2 years, at least 2.5 years or at least 3 years before substantially changing its characteristics.

The invention further provides a method of preparing the pasta structure of the present invention, comprising steps of
   a) mixing ingredients for the pasta dough comprising water, wheat and the enzyme,
   b) forming the pasta dough into the structure, and
   c) drying the pasta structure until it has a water content of less than 14% (wt/wt), based on the total weight of the final structure, and,
   d) optionally, packaging the pasta structure.

In step a), the wheat is preferably T. aestivum and provided as flour. As described above, the wheat may alternatively also be T. durum, T. dicoccum, T. spelta or T. monococcum. It may also be provided as semolina, or a mixture of semolina and flour. In an optional embodiment, the pasta dough may also comprise eggs. However, since the pasta structure of the present invention should be suitable for long-term storage, the pasta dough preferably does not comprise eggs. The dough may further comprise an edible color additive, e.g. a food color such as betanin, anthocyanin, beta-carotene, riboflavin, tartrazine, curcumin, indigo carmine, Allura Red AC, sepia, xanthin, xeaxanthin, lutein or Quinoline Yellow WS, or an extract from a plant, such as a spinach extract, a red beet extract, a carrot extract, or Calendula officinalis extract. Additional optional ingredients may be, e.g., a flavoring, e.g., sugar or sweetener, and/or a hydrophobic component such as a wax, e.g., beeswax. The enzyme of the invention is preferably added together with the other ingredients prior to mixing. Alternatively, it may be first added either to the water or the wheat product and premixed, before adding the wheat product or the water, respectively, and forming the dough. The enzyme may also be added after the water and the wheat have been mixed to create a dough. A possible recipe for the pasta dough is described in the example below.

As previously described, step b) may involve forming, extruding, moulding, kneading, pressing, pulling, rolling, blowing, cutting or punching the pasta dough into a structure, e.g., a food handling device as defined herein. A combination of any of these forming methods can also be applied. Pressing is a preferred embodiment of step b).

In step c), the pasta structure is dried to obtain a final structure with a water content of less than 14% (wt/wt). Drying may take place at temperatures of up to 45° C., up to 50° C., up to 55° C., up to 60° C., up to 65° C., up to 70° C., up to 75° C., up to 80° C., up to 85° C., up to 90° C., up to 95° C., up to 100° C., up to 105° C. or up to 110° C., typically, until the desired water content of the final pasta structure is reached. Preferably, the pasta structure is dried at a temperature of up to 86° C. as described in the example below. To avoid the development of cracks in the pasta, drying should not be performed too fast. On the other hand, too slow drying may favor the growth of mold. Preferably the pasta structure should be dried for about 200-400 min, preferably for 250-350 min, more preferably for 275-325 min, e.g., about 300 min. Drying can be performed by any suitable method known in the state of the art, i.e. the pasta structure may first be pre-dried at room temperature before most of the moisture is removed in a final drying step. The final drying step may first comprise a step wherein the pasta structure is exposed to high temperatures and humidity, before in the second step, the temperature is slowly reduced and cold air is provided to stabilize the pasta structure. A possible drying process is presented in Tab. 2 and described in the example below.

After drying, the pasta structure according to the invention may optionally be impregnated with an edible layer selected from the group comprising a hydrophobic layer such as a wax, a coloring layer and a flavoring layer. The wax may be selected from the group comprising bayberry wax, candelilla wax, carnauba wax, castor wax, ouricury wax, rice bran wax, soy wax, tallow wax, beeswax or a combination thereof. The wax may further increase the durability of the pasta structure and prolong the amount of time the pasta structure can be contacted with a liquid or a liquid-containing food without significantly loosing stability. In addition, the hydrophobic layer, e.g., the wax, may contribute to a more familiar, smoother mouthfeel of the pasta structure (e.g., a straw, a spoon or a fork) that resembles that of an equivalent structure made from plastics. The coloring layer may comprise a food color additive, e.g., as defined above. The pasta structure of the invention is preferably taste-less, i.e., it will not affect or alter the taste of a beverage or food that is to be consumed with the help of the structure. However, if desired, the pasta structure may optionally be modified with a flavoring layer. The flavoring layer may be sweet, e.g., due to the addition of sugar. Alternatively, the flavoring layer may comprise a spice or a combination of multiple spices. The flavoring layer may e.g., be a wax as defined above that has been supplemented with, e.g., sugar or at least one spice and/or a coloring.

In an optional step d) the pasta structure may be packaged to facilitate transport and distribution of the pasta structure. To ensure maximum shelf-life, the pasta structure may be packaged in a vacuum-sealed package, e.g. a bag or a blister package. Optionally, the pasta structure is packaged in ecologically friendly, biodegradable package, e.g. a bag made of paper, or a bag of bio-degradable plastic.

The invention further teaches the use of at least one enzyme capable of stabilizing a pasta structure, wherein the enzyme is selected from the group comprising a carboxy-lester hydrolase, a transglutaminase, an oxidase or an oxygenase, for stabilizing a pasta structure. In particular, it is used for stabilizing an uncooked pasta structure. Said pasta structure can advantageously be used as a food-handling device, e.g., as a straw. The pasta structure of the invention is obtained, e.g., by preparing the pasta structure by the method as described herein.

Finally, the invention also provides a use of the pasta structure according to the invention or obtainable by the herein described method as a food-handling device. The food-handling device facilitates handling of a food or beverage, e.g. its consumption, carrying, stirring, storage or transport. Preferably, the food or beverage is cold, i.e. it has a temperature below 30° C., most preferably below room temperature (25° C.). Most preferably, the pasta structure may be used as a drinking straw as defined herein.

In summary, the invention teaches a pasta structure, e.g., a food-handling device, comprising an enzyme capable of stabilizing the pasta structure to delay or prevent its destabilization in the presence of water or a water-containing liquid and/or food. As disclosed herein, enzymes such as carboxylester hydrolases, transglutaminases, oxidases or oxygenases are capable of modifying the pasta matrix in a way that reduces or even prevents the loss of starch from the pasta in the presence of water. The inventors were therefore able to provide an inexpensive, ecologically friendly and fully biodegradable alternative to food handling devices made of plastic, while avoiding many of the undesired drawbacks associated with other plastic-free alternatives known from the state of the art, in particular lack of stability and unpleasant off-tastes.

Throughout the invention, the term "about" is intended to be understood as "+/-10%". If "about" relates to a range, it refers to both lower and upper limit of the range. "A" is intended to mean "one or more", if not explicitly mentioned otherwise.

All literature cited herein is herewith fully incorporated. The present invention is further illustrated, but not limited, by the following example.

BRIEF DESCRIPTION OF THE DRAWINGS

FIG. 1 Effects of alpha-amylase and at least one lipase on starch loss from pasta made of *T. aestivum* or *T. durum* upon exposure to distilled water as determined via addition of Lugol's solution. The images visualize the gradual starch loss from pasta in the presence of distilled water over time (0-60 min) at room temperature. Assessment of starch loss was based on the formation of dark inclusion compounds due to reaction of washed-out starch with Lugol's solution. a) Pasta made of *T. aestivum*. First row: negative control, pasta without enzyme; second row: pasta comprising alpha-amylase; third row: pasta comprising the lipolytic enzyme Pastazym Super Flex; fourth row: pasta comprising another lipolytic enzyme, Pastazym Duo Pure. b) Pasta made of *T. durum*. First row: negative control pasta without enzyme; second row: pasta comprising alpha-amylase; third row: pasta comprising the lipolytic enzyme Pastazym Super Flex.

FIG. 2 Quantification of starch loss from FIG. 1. The figure represents the calculated color differences between treated and untreated samples at different exposure times a)

Figure 4A:
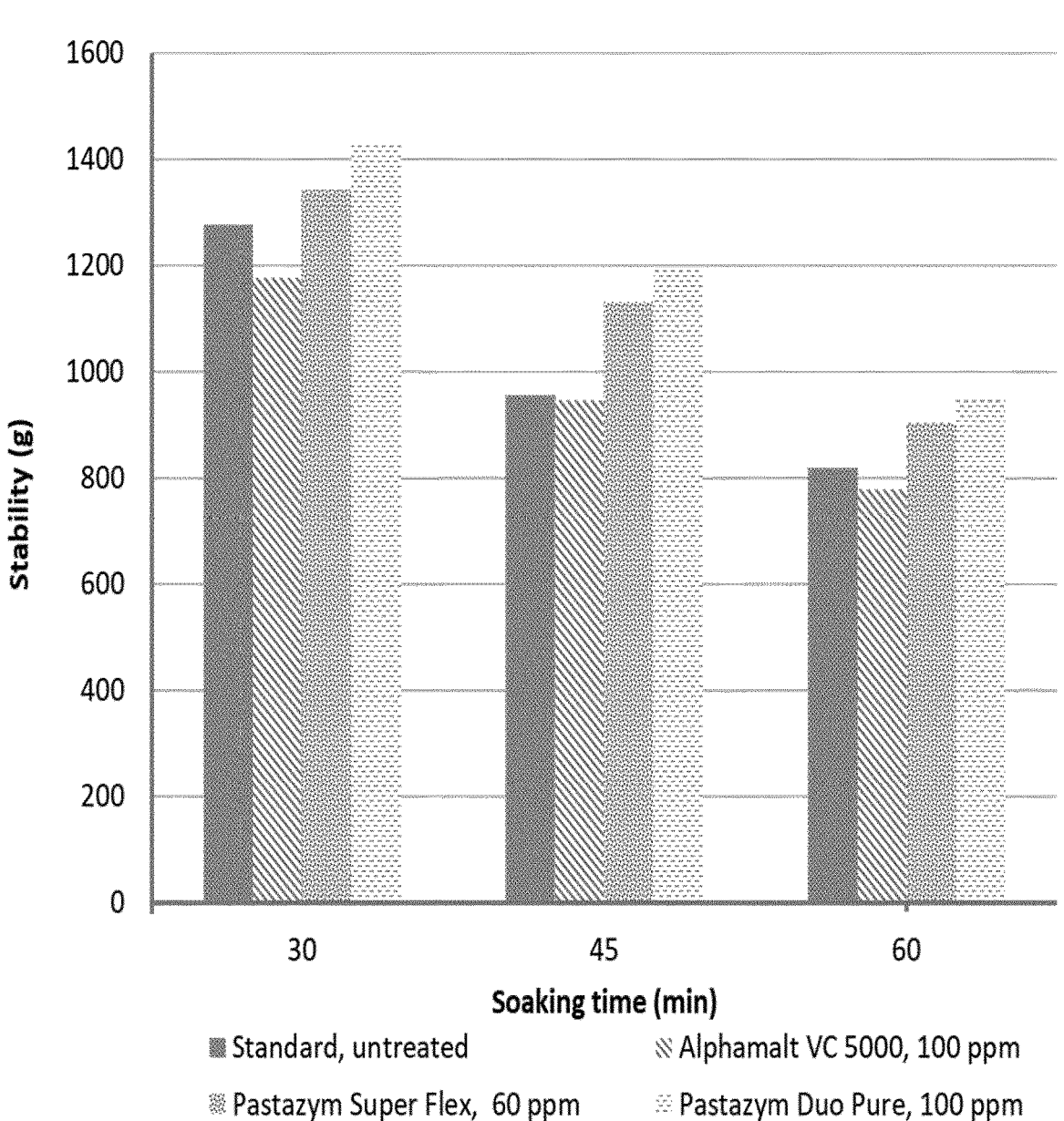

for pasta from soft wheat flour (*T. aestivum*), and b) for pasta from durum wheat semolina (*T. durum*). For precise calculation method, see example.

FIG. 3 Effects of alpha-amylase and at least one lipase on starch loss from pasta made of *T. aestivum* or *T. durum* upon exposure to distilled water as determined by assessing sample turbidity. The images display the turbidity caused by starch leakage into the soaking water from soft and hard wheat pasta samples after soaking for 20-60 min in distilled water at room temperature. a) Pasta made from *T. aestivum*. The first row shows an untreated reference sample, the second row the effect of fungal alpha-amylase, the third row the effect of the lipolytic enzyme Pastazym Super Flex, and the fourth row the effect of another lipolytic enzyme, Pastazym Duo Pure. b) Pasta made from *T. durum*. The first row shows an untreated reference sample, the second row the effect of fungal alpha-amylase, and the third row the effect of a lipolytic enzyme, Pastazym Super Flex.

FIG. 4 Effect of alpha-amylase or at least one lipase on strength of pasta made from *T. aestivum* or *T. durum* upon prolonged exposure to distilled water at room temperature. The strength of the pasta structures was assessed after 30, 45 and 60 min using a Texture Analyzer. The graph in a) shows the results for pasta made of soft wheat (*T. aestivum*) flour, b) for pasta made of durum wheat (*T. durum*) semolina. Addition of the lipases Pastazym Super Flex or Pastazym Duo Pure slowed down the softening of soft wheat and durum wheat pasta in the presence of water, whereas amylase Alphamalt VC 5000 noticeably accelerated softening in both pasta types, as compared to the respective negative control pasta lacking any of these enzymes.

SEQ ID NO: 1 Amino acid sequence of lipase Pastazym Duo Pure

SEQ ID NO: 2 Amino acid sequence of lipase Pastazym Super Flex

SEQ ID NO: 3 Amino acid sequence of glucose oxidase Sternzym Gloxy (glucose oxidase from *Saccharomyces cerevisiae*, a FAD-linked glucose oxidase)

SEQ ID NO: 4 Amino acid sequence of Sternzym Gloxy TGO (glucose oxidase from *Penicillium chrysogenum*, a FAD-linked glucose oxidase)

SEQ ID NO: 5 Amino acid sequence of Thiolase, a FAD-linked sulfhydryl oxidase from *Saccharomyces cerevisiae*

SEQ ID NO: 6 Amino acid sequence of transglutaminase Sternzym PT 8001

SEQ ID NO: 7 Amino acid sequence of laccase Suberase

EXAMPLE

In the following experiment, pasta was prepared with dough in the presence or absence of specific enzymes to assess changes in the stability and strength of the pasta in the presence of water. Starch loss is considered an indication of loss of stability, as the starch is washed out of the matrix. Accordingly, with increasing starch loss, the pasta becomes softer and less stable.

Materials and Methods

Preparation of Pasta

For the pasta dough, 2,000 g of *T. aestivum* wheat flour or *T. durum* wheat semolina (for results of analyses see Table 1) were mixed with 520 mL or 600 mL tab water, respectively. The dough was formed into a tubular shape using laboratory-scale pasta press (MAC 30S, Italpast S.r.l., Italy). For the negative control group, the dough was prepared without adding any enzyme. In addition, pasta was prepared comprising 100 mg/kg of fungal alpha-amylase (Alphamalt VC 5000, Mühlenchemie GmbH & Co. KG, Germany), an enzyme capable of catalyzing the hydrolysis of starch. It is used e.g. for flour standardization and improvement. For the positive group, 150 mg/kg of lipolytic enzyme (Pastazym Duo Pure, or Pastazym Super Flex, Mühlenchemie GmbH & Co. KG, Germany) were added to the flour.

TABLE 1

| Analysis results for *T. aestivum* flour and *T. durum* semolina | | | | |
|---|---|---|---|---|
| Property | Method | Dimension | Semolina | Flour |
| Moisture | ICC 1190/1 | % | 11.6 | 14.1 |
| Protein | ICC 159 | % | 14.7 | 12.7 |
| Wet gluten | ICC 155 | % | 37.3 | 29.3 |
| Gluten Index | ICC 155 | | 82 | 96 |
| Falling Number | ICC 107 | s | n.d. | 332 |
| Ash | ICC 104/1 | % | 1.08 | 0.62 |
| Starch damage | ICC 172 | %/UCD | n.d. | 4.94/13.9 |
| Farinograph | ICC 115/1 | | | |
| Water absorption | | % | 59.1 | 54.9 |
| Stability | | mm:ss | 05:51 | 08:31 |
| Softening (12 min) | | FU | 56 | 53 | n.d. = not determined
UCD = Unités Chopin Dubois, Chopin Dubois units
FU = Farinograph units In all trials, all dry ingredients, e.g. flour and enzymes, were premixed for 2 min at 118 $min^{-1}$ in a Hobart N50 mixer (Hobart GmbH, Germany).

After forming, the resulting pasta structures were dried in a static dryer (Pavan, Italy) for 315 minutes at temperatures of up to 86° C. until a moisture content of the pasta of less than 12% was reached. The drying was performed in 10 steps with different drying air temperature and moisture settings (see Table 2).

TABLE 2

| Pasta drying process including air temperature, air moisture and time settings | | | |
|---|---|---|---|
| Step | Temperature (° C.) | Air humidity (%) | Duration (min) |
| 1 | 68 | 50 | 10 |
| 2 | 68 | 65 | 15 |
| 3 | 75 | 70 | 20 |
| 4 | 85 | 75 | 30 |
| 5 | 85 | 78 | 35 |
| 6 | 86 | 75 | 50 |
| 7 | 79 | 79 | 45 |
| 8 | 77 | 79 | 45 |
| 9 | 75 | 70 | 45 |
| 10 | 25 | 55 | 20 |

Detection of Starch Loss from Pasta 10 g of each pasta sample, either comprising 100 mg Pastazym Duo Pure or 60 mg Pastazym Super Flex per kg of flour/semolina or no enzyme at all, were added to a beaker containing 100 mL distilled water (22° C.). The amount of washed-out starch in the water was assessed after 20, 30, 45 or 60 min either by assessing the turbidity of the soaking water or, alternatively, after 0, 20, 30, 45 and 60 min by mixing 50 g of the soaking water with 10 drops of a 1% (wt/wt) Lugol's solution. Lugol's solution intercalates into the α-helix of amylose present in starch, resulting in the formation of dark inclusion compounds. The tests were performed at room temperature. Using a colorimeter (Chromameter CR-400/410, Konica Minolta, Japan), the L*, a*, b* values were measured against a blank reference prepared by mixing 50 g distilled water with 10 drops of Lugol's solution.

The L-value served as the main measure of brightness: The more starch in the solution, the lower the L-value, since the continuously increasing formation of black inclusion compounds reduced the brightness of the solution.

The color distance ΔE between the sample and the reference was subsequently calculated as follows:

$$\Delta E^* = \sqrt{(\Delta L^*)^2 + (\Delta a^*)^2 + (\Delta b^*)^2}$$

Assessment of Pasta Strength

Strength of pasta was assessed after 30, 45 and 60 min with Texture Analyzer (TA.XT plus, Micro Stable Systems, USA) using 5 kg load cell. The force was measured with a Perspex blade (code A/LKB-F) as probe that penetrated three pasta tubes with defined path length. Therefore, the three pasta tubes were placed centrally under the Perspex knife on a HDP/90 Heavy Duty platform. With a test speed of 17 mm/s, the Perspex knife covered a total distance of 5.5 mm, starting at an initial height of 6 mm, while penetrating the three pasta tubes.

Results

Detection of Starch Loss from Pasta Made of *T. aestivum* or *T. durum*

As shown in FIG. 1*a* and quantified in Tab. 3 and 4, the soaking water comprising pasta made from *T. aestivum* developed an increasingly darker coloration upon addition of Lugol's solution as incubation time progressed, indicative of increased amounts of dissolved starch in the water. A similar observation was made when testing the soaking water containing pasta made of *T. durum*. However, in the absence of any enzyme, the loss of starch was more pronounced in pasta made of *T. aestivum* flour than that made of *T. durum* semolina. For both pasta types, the presence of alpha-amylase resulted in a noticeable increase of starch loss already after 20 to 30 min, as indicated by a much darker coloration of the water when mixed with Lugol's solution. This was expected, as alpha amylase catalyzes the hydrolysis of starch and thus promotes the solubilization and hence the loss of starch into the surrounding medium. Addition of either Pastazym Super Flex or Pastazym Duo Pure to the pasta dough made of *T. aestivum* significantly alleviated the loss of starch from the pasta into the water, indicated by a lighter discoloration as compared to the reference (FIG. 1*a* and FIG. 2*a*). Similarly, the presence of Pastazym Duo Pure in the *T. durum* pasta sample significantly delayed starch loss from the pasta structure into the soaking water (FIGS. 1*b* and 2*b*). These results were further confirmed when assessing starch loss from the different pasta samples by comparing the starch-induced turbidity of the soaking water after 20, 30, 45 or 60 min (FIG. 3). Of note, in pasta prepared from *T. aestivum*, the Pastazym Duo Pure appeared to prevent starch loss most effectively, as the Lugol's solution-induced coloration as well as the turbidity of the soaking water of the pasta supplemented with this enzyme was significantly lower compared to that of the other samples (FIGS. 2*a* and 3*a*, bottom row). Without being bound to theory we assume that the specific lipolytic activity of Pastazym Duo Pure is more suitable for prevention of starch losses because it is more specific for triglycerides, resulting in di- and monoglycerides and fatty acids with a higher affinity to starch than the lyso-lipids created by Pastazym Super Flex. The latter exerts hydrolytic activity also on glyco- and phospholipids, hence is less specific for triglycerides than Pastazym Duo Pure.

TABLE 3

Color values of untreated control samples

| Standard (no enzyme) | Time (min) | | | | |
| --- | --- | --- | --- | --- | --- |
| | 0 | 20 | 30 | 45 | 60 |
| L* | 67.06 | 46.53 | 45.07 | 41.30 | 39.23 |
| a* | −1.95 | 2.39 | 2.71 | 2.98 | 3.07 |
| b* | 29.94 | 10.76 | 9.28 | 0.88 | −0.63 |
| Color distance ΔE* | 0.00 | 23.58 | 24.32 | 26.24 | 28.29 |

| | Color distances | | |
| --- | --- | --- | --- |
| Time (min) | ΔL* | Δa* | Δb* |
| 0 | 0 | 0 | 0 |
| 20 | 20.53 | 4.34 | 19.18 |
| 30 | 21.99 | 4.66 | 20.66 |
| 45 | 25.76 | 4.93 | 29.07 |
| 60 | 27.83 | 5.02 | 30.57 |

TABLE 4

Color values samples treated with Pastazym Duo Pure

| Enzyme treated | Time (min) | | | | |
| --- | --- | --- | --- | --- | --- |
| | 0 | 20 | 30 | 45 | 60 |
| L* | 67.06 | 61.04 | 57.13 | 56.81 | 55.58 |
| a* | −1.95 | 0.06 | 0.12 | 0.17 | 0.35 |
| b* | 29.94 | 22.83 | 18.65 | 12.56 | 10.11 |
| Color distance ΔE* | 0.00 | 9.53 | 15.18 | 20.29 | 23.03 |

| | Color distances | | |
| --- | --- | --- | --- |
| Time (min) | ΔL* | Δa* | Δb* |
| 0 | 0 | 0 | 0 |
| 20 | 6.02 | 2.01 | 7.11 |
| 30 | 9.93 | 2.07 | 11.29 |
| 45 | 10.25 | 2.12 | 17.38 |
| 60 | 11.48 | 2.30 | 19.83 |

Assessment of Strength of Pasta Comprising *T. aestivum* or *T. durum*

Figure 4B:
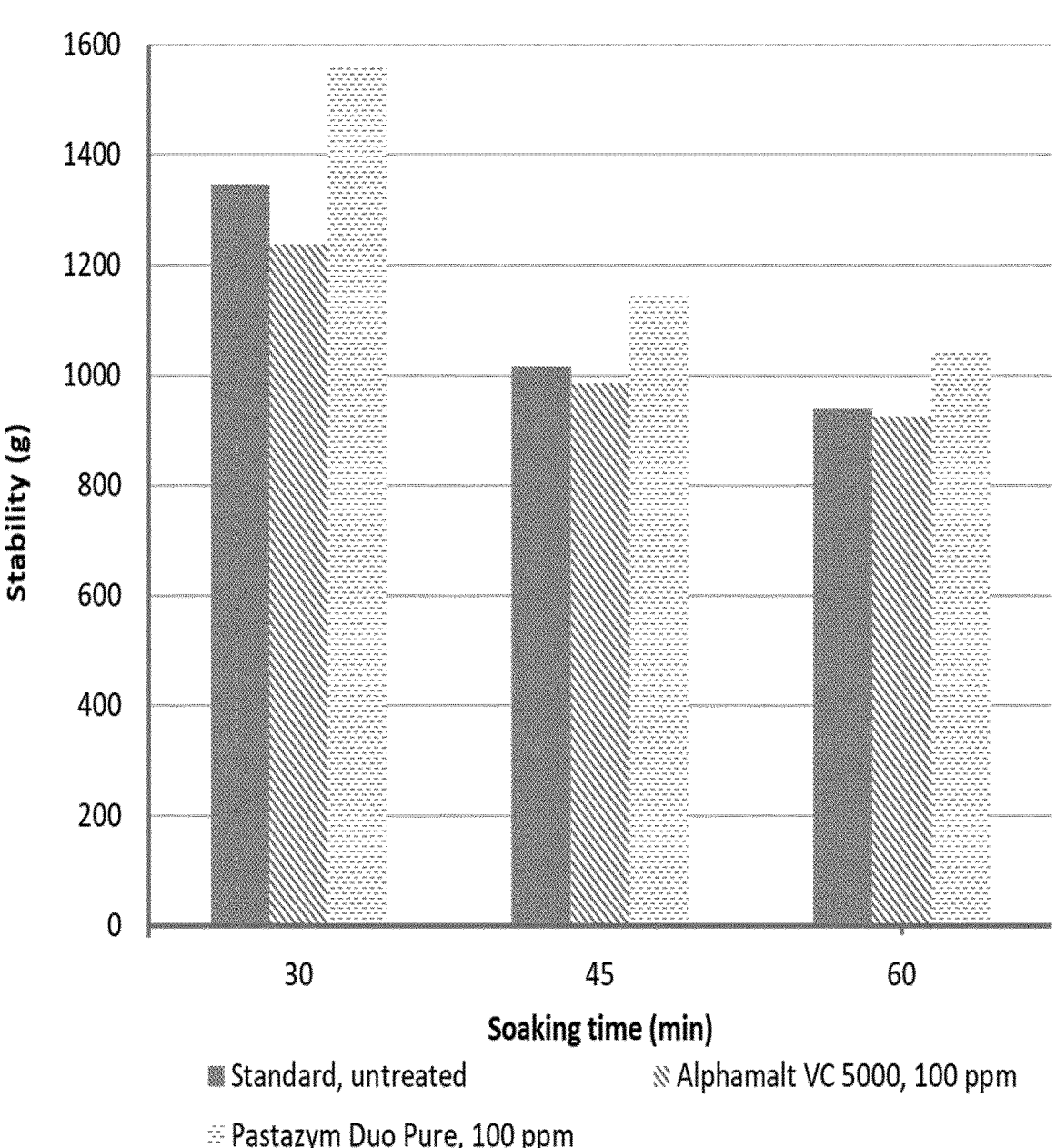

The strength of pasta made with Pastazym Duo Pure or Pastazym Super Flex was compared to the strength of equivalent pasta structures without any enzyme (negative control). The pasta samples were soaked in water (22° C.) for 30, 45 and 60 minutes and subsequently subjected to mechanical stress using a measuring device. Both the enzyme-treated as well as the negative control pasta showed decreasing strength the longer the pasta was immersed in the water. However, the reduction in strength of pasta prepared from *T. aestivum* was less pronounced in the pasta comprising the Pastazym Duo Pure or Pastazym Super Flex, compared to the negative control (FIG. 4*a*). For pasta from durum wheat, only Pastazym Duo Pure was tested. Again, addition of the lipase resulted in improved strength as compared to the control pasta sample without any enzyme (FIG. 4*b*). In both tests, fungal amylase decreased the pasta strength. Table 5 displays the quantified data for the stability assays as well as the relative stability of each sample, as determined by comparing each pasta sample to a respective reference sample without the enzymes, which had been soaked in water for the same duration. The table further underlines the positive effect of the lipases and the negative effect of the alpha-amylase on pasta strength.

Taken together, the enzyme Pastazym Duo Pure effectively stabilized both pasta structures made from either *T. aestivum* or *T. durum*, i.e., the obtained pasta structures exhibited a comparable stability regardless of the wheat species used.

Therefore, it could be shown that by modifying pasta made of *T. aestivum* with a lipase, it was possible to increase its stability to a level higher than that of a conventional, commercially available pasta made of *T. durum*. The stabilizing effect of, e.g., a lipase thus allows for the use of the significantly cheaper *T. aestivum* wheat for the preparation of a highly stable food handling device, e.g., a drinking straw. In addition, it allows for further stabilizing food handling devices made from *T. durum*.

TABLE 5

Stability data for soft wheat and durum
wheat pasta after soaking in distilled water
Stability (g)

| | Soaking time (min) | | |
|---|---|---|---|
| Sample | 30 | 45 | 60 |
| Soft wheat pasta | | | |
| Standard, untreated | 1278 | 955 | 819 |
| Alphamalt VC 5000, 100 ppm | 1177 | 947 | 778 |
| Pastazym Super Flex, 60 ppm | 1343 | 1131 | 904 |
| Pastazym Duo Pure, 100 ppm | 1425 | 1015 | 861 |
| Durum wheat pasta | | | |
| Standard, untreated | 1346 | 1017 | 940 |
| Alphamalt VC 5000, 100 ppm | 1237 | 986 | 926 |
| Pastazym Duo Pure, 100 ppm | 1557 | 1150 | 1043 |

Relative stability (%), compared to
standard after same soaking time

| | Soaking time (min) | | |
|---|---|---|---|
| Sample | 30 | 45 | 60 |
| Soft wheat pasta | | | |
| Standard, untreated | 100 | 100 | 100 |
| Alphamalt VC 5000, 100 ppm | 92 | 99 | 95 |
| Pastazym Super Flex, 60 ppm | 105 | 118 | 110 |
| Pastazym Duo Pure, 100 ppm | 112 | 106 | 105 |
| Durum wheat pasta | | | |
| Standard, untreated | 100 | 100 | 100 |
| Alphamalt VC 5000, 100 ppm | 92 | 97 | 99 |
| Pastazym Duo Pure, 100 ppm | 116 | 113 | 111 |

REFERENCES

Kane et al., 2020, Seafloor microplastic hotspots controlled by deep-sea circulation. Science 368(6495), 1140-1145.

AU 2018101026
WO 2020/069587
WO2020/044049
Zanini de Vita, O., 2009. Encyclopedia of pasta, Volume 26, University of California Press
Zilic et al., 2011. Characterization of proteins from grain of different bread and durum wheat genotypes. Int. J. Mol. Sci. 12(9), 5878-5894.
Shewry et al., 2002. The structure and properties of gluten: an elastic protein from wheat grain. Phil. Trans. R. Soc. Lond. 357, 133-142.
Sacchetti et al., 2011. Effect of semolina particle size on the cooking kinetics and quality of spaghetti. Proc. Food Sci. 1, 1740-1745.
Hareland, G. A., 1994. Evaluation of flour particle size distribution by laser diffraction, sieve analysis and near-infrared reflectance spectroscopy. J. Cereal Sci. 20(2), 183-190.
Horstmann et al., 2017 Starch characteristics linked to gluten-free products. Foods 6(4), 29-50.
Kibar et al., 2014. Effects of fatty acid addition on the physicochemical properties of corn starch. Int. J. Food Prop. 17(1), 204-218.
Morrison, W. R., 1994. Wheat lipids: structure and functionality. Bushuk W., Rasper V. F. (eds) Wheat. Springer.
Meerts et al., 2017. Enhancing the rheological performance of wheat flour dough with glucose oxidase, transglutaminase or supplementary gluten. Food Bioproc.Technol. 10(12), 2188-2198.
Selinheimo, E., 2008. Tyrosinase and laccase as novel crosslinking tools for food biopolymers, PhD Thesis, VTT publications, 693.
www.europarl.europa.eu/news/en/headlines/society/20181212STO21610/plastic-waste-and-recycling-in-the-eu-facts-and-figures
www.bund.net/fileadmin/user_upload_bund/publikationen/chemie/chemie_plastikatlas_2019.pdf
www.wisefood.eu
makkaroni-strohhalme-kaufen.de
www.sausalitos.de/shop/sausaroni-pasta-strohhalme~p44976
www.vomfass.de/pasta-strohhalme
www.pastastraws.org
stroodles.co.uk
www.drinkstuff.com/products/product.asp?ID=27441
en.wikipedia.org/wiki/Semolina
www.haverparticleanalysis.com/en/sieve-analysis/ro-tapr-test-sieve-shaker/
www.retsch.com/products/sieving/sieve-shakers/as-200-control/function-features/
gkm-net.de/en/laboratory-air-jet-lab-sieves.html
www.prvhh.de/newsroom/muehlenchemie/de/presse-meldung/news/detail/News/pastazym-pd-erzielt-starke-verbesserung-der-kochtoleranz-von-pasta/
texturetechnologies.com/industries/food-texture-analysis/pasta#:~:text=XTPlus%20Texture%20Analyzer%20is%20accurate,will%20accept%20your%20test%20results

20

The invention claimed is:

1. A method for making a food-handling device made from uncooked pasta, the method comprising steps of:
   a) mixing ingredients for a pasta dough comprising water, wheat and at least one enzyme selected from the group consisting of a lipase having at least 80% amino acid sequence identity to SEQ ID NO: 1, a lipase having at least 80% amino acid sequence identity to SEQ ID NO: 2, a glucose oxidase having at least 80% amino acid sequence identity to SEQ ID NO: 3, a glucose oxidase having at least 80% amino acid sequence identity to SEQ ID NO: 4, a sulfhydryl oxidase having at least 80% amino acid sequence identity to SEQ ID NO: 5, a transglutaminase having at least 80% amino acid sequence identity to SEQ ID NO: 6 and a laccase having at least 80% amino acid sequence identity to SEQ ID NO: 7,
   b) forming the pasta dough into a food-handling structure, and
   c) drying the food-handling structure to obtain a food handling device made from uncooked pasta having a water content of less than 14% (wt/wt), based on the total weight of the food-handling device.

* * * * *